(12) United States Patent
Balasubramanian et al.

(10) Patent No.: US 12,137,489 B2
(45) Date of Patent: Nov. 5, 2024

(54) DYNAMIC CONTROL OF SIDELINK RESOURCES IN A COMMUNICATION NETWORK

(71) Applicant: QUALCOMM Incorporated, San Diego, CA (US)

(72) Inventors: Anantharaman Balasubramanian, San Diego, CA (US); Wanshi Chen, San Diego, CA (US); Shuanshuan Wu, San Diego, CA (US); Gabi Sarkis, San Diego, CA (US); Sudhir Kumar Baghel, Hillsborough, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/223,987

(22) Filed: Apr. 6, 2021

(65) Prior Publication Data

US 2021/0329720 A1 Oct. 21, 2021

Related U.S. Application Data

(60) Provisional application No. 63/011,898, filed on Apr. 17, 2020.

(51) Int. Cl.
| | | |
|---|---|---|
| *H04W 76/14* | (2018.01) | |
| *H04W 4/40* | (2018.01) | |
| *H04W 72/02* | (2009.01) | |
| *H04W 72/23* | (2023.01) | |
| *H04W 76/28* | (2018.01) | |
| *H04W 80/02* | (2009.01) | |

(Continued)

(52) U.S. Cl.
CPC ............. *H04W 76/14* (2018.02); *H04W 4/40* (2018.02); *H04W 72/02* (2013.01); *H04W 72/23* (2023.01);

(Continued)

(58) Field of Classification Search
CPC . H04W 4/40–48; H04W 8/005; H04W 16/26; H04W 36/0083; H04W 52/02;
(Continued)

(56) References Cited

U.S. PATENT DOCUMENTS

2019/0246377 A1 8/2019 Zhou et al.
2019/0364554 A1 11/2019 Kuang et al.
(Continued)

FOREIGN PATENT DOCUMENTS

CN 109644433 A 4/2019
CN 110115080 A 8/2019
(Continued)

OTHER PUBLICATIONS

"3GPP TS 36.321 V16.0.0 (Mar. 2020)" 3rd Generation Partnership Project, published on Apr. 8, 2020, https://protoal.3gpp.org/desktopmodules/Specifications/SpecificationDetails.aspx?specificationId=2437; access on Feb. 8, 2024, pp. 0-141 (Year: 2020).*

(Continued)

*Primary Examiner* — Thomas R Cairns
(74) *Attorney, Agent, or Firm* — QUALCOMM Incorporated

(57) ABSTRACT

Certain aspects of the present disclosure provide techniques for dynamically controlling sidelink resources in a communication network. In one aspect, a method for configuring resources in a communication network, includes: establishing a first data connection with a user equipment; establishing a second data connection with a vehicle user equipment; transmitting to the user equipment via the first data connection an indication to activate a pool of V2X sidelink resources; and transmitting to the vehicle user equipment via the second data connection the indication to activate the pool of V2X sidelink resources.

26 Claims, 13 Drawing Sheets

(51) Int. Cl.
  *H04W 88/04* (2009.01)
  *H04W 92/18* (2009.01)
(52) U.S. Cl.
  CPC .......... *H04W 76/28* (2018.02); *H04W 80/02* (2013.01); *H04W 88/04* (2013.01); *H04W 92/18* (2013.01)
(58) Field of Classification Search
  CPC ... H04W 72/02; H04W 72/042; H04W 76/14; H04W 76/28; H04W 80/02; H04W 84/047; H04W 84/18; H04W 84/22; H04W 88/04; H04W 92/18; H04W 72/23–232; H04W 72/40; H04W 36/0082; H04W 4/42–48
  See application file for complete search history.

(56) References Cited

U.S. PATENT DOCUMENTS

2020/0077391 A1   3/2020   Choi et al.
2020/0229195 A1*  7/2020   Lien ..................... H04L 5/0098
2021/0152296 A1*  5/2021   Chen ..................... H04L 1/189
2021/0385710 A1* 12/2021   Jin ..................... H04W 36/0072
2022/0201716 A1*  6/2022   Yi ..................... H04W 72/0453

FOREIGN PATENT DOCUMENTS

| EP | 3668210 A1 | 6/2020 |
| WO | 2015140039 A1 | 9/2015 |
| WO | 2019029144 A1 | 2/2019 |
| WO | WO-2019240745 A1 * | 12/2019 |
| WO | 2020033088 A1 | 2/2020 |

OTHER PUBLICATIONS

"3GPP TS 38.321 V16.0.0 (Mar. 2020)" 3rd Generation Project, published on Apr. 9, 2020; accessed via the Internet on May 18, 2024, pp. 1-142 (Year: 2020).*
International Search Report and Written Opinion—PCT/US2021/026204—ISA/EPO—Jul. 21, 2021.

* cited by examiner

DYNAMIC CONTROL OF SIDELINK RESOURCES IN A COMMUNICATION NETWORK

CROSS-REFERENCE TO RELATED APPLICATIONS

This application claims the benefit of and priority to U.S. Provisional Patent Application No. 63/011,898, filed on Apr. 17, 2020, the entire contents of which are incorporated herein by reference.

BACKGROUND

Field of the Disclosure

Aspects of the present disclosure relate to wireless communications, and more particularly, to techniques for dynamically controlling sidelink resources in a communication network.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved control of sidelink resources, including V2P, P2V, and more generally V2X resources, in a communication network.

A first aspect provides a method for configuring resources in a communication network, including: establishing a first data connection with a user equipment; establishing a second data connection with a vehicle user equipment; transmitting to the user equipment via the first data connection an indication to activate a pool of V2X sidelink resources; and transmitting to the vehicle user equipment via the second data connection the indication to activate the pool of V2X sidelink resources.

A second aspect provides a method for configuring resources in a communication network, including: establishing a data connection with a network element; receiving via the data connection an indication to activate a pool of V2X sidelink resources; activating the pool of V2X sidelink resources; and transmitting a message to a vehicle user equipment via a second data connection using the pool of V2X sidelink resources.

A third aspect provides a method for configuring resources in a communication network, including: establishing a data connection with a user equipment; transmitting to the user equipment via the data connection an indication to update a DRX interval, wherein: the indication to update a DRX interval comprises a logical channel ID, and the logical channel ID comprises a bit string in a header of a MAC control element.

A fourth aspect provides a method for configuring resources in a communication network, including: establishing a data connection with a network element; receiving from the network element via the data connection an indication to update a DRX cycle time, wherein: the indication to update the DRX cycle time comprises a logical channel ID, and the logical channel ID comprises a bit string in a header of a MAC control element; and updating the DRX cycle time.

A fifth aspect provides a method for configuring resources in a communication network, including: establishing a data connection with a user equipment; transmitting to the user equipment via the data connection an indication to update a V2X sidelink pool configuration, wherein: the indication to update the V2X sidelink pool configuration comprises a logical channel ID, and the logical channel ID comprises a bit string in a header of a MAC control element.

A sixth aspect provides a method for configuring resources in a communication network, including: establishing a data connection with a network element; receiving from the network element via the data connection an indication to update a V2X sidelink pool configuration, wherein: the indication to update the V2X sidelink pool configuration comprises a logical channel ID, and the logical channel ID comprises a bit string in a header of a MAC control element; and updating the V2X sidelink pool configuration.

A seventh aspect provides a method for configuring resources in a communication network, including: establishing a first data connection with a user equipment; establishing a second data connection with a vehicle user equipment; transmitting to the user equipment via the first data connection an indication to activate a pool of sidelink resources;

and transmitting to the vehicle user equipment via the second data connection the indication to activate the pool of sidelink resources.

An eighth aspect provides a method for configuring resources in a communication network, including: establishing a data connection with a network element; receiving from the network element via the data connection an indication to activate a pool of sidelink resources; activating the pool of sidelink resources; receiving from the network element via the data connection an indication to configure the pool of sidelink resources; and configuring the pool of sidelink resources.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
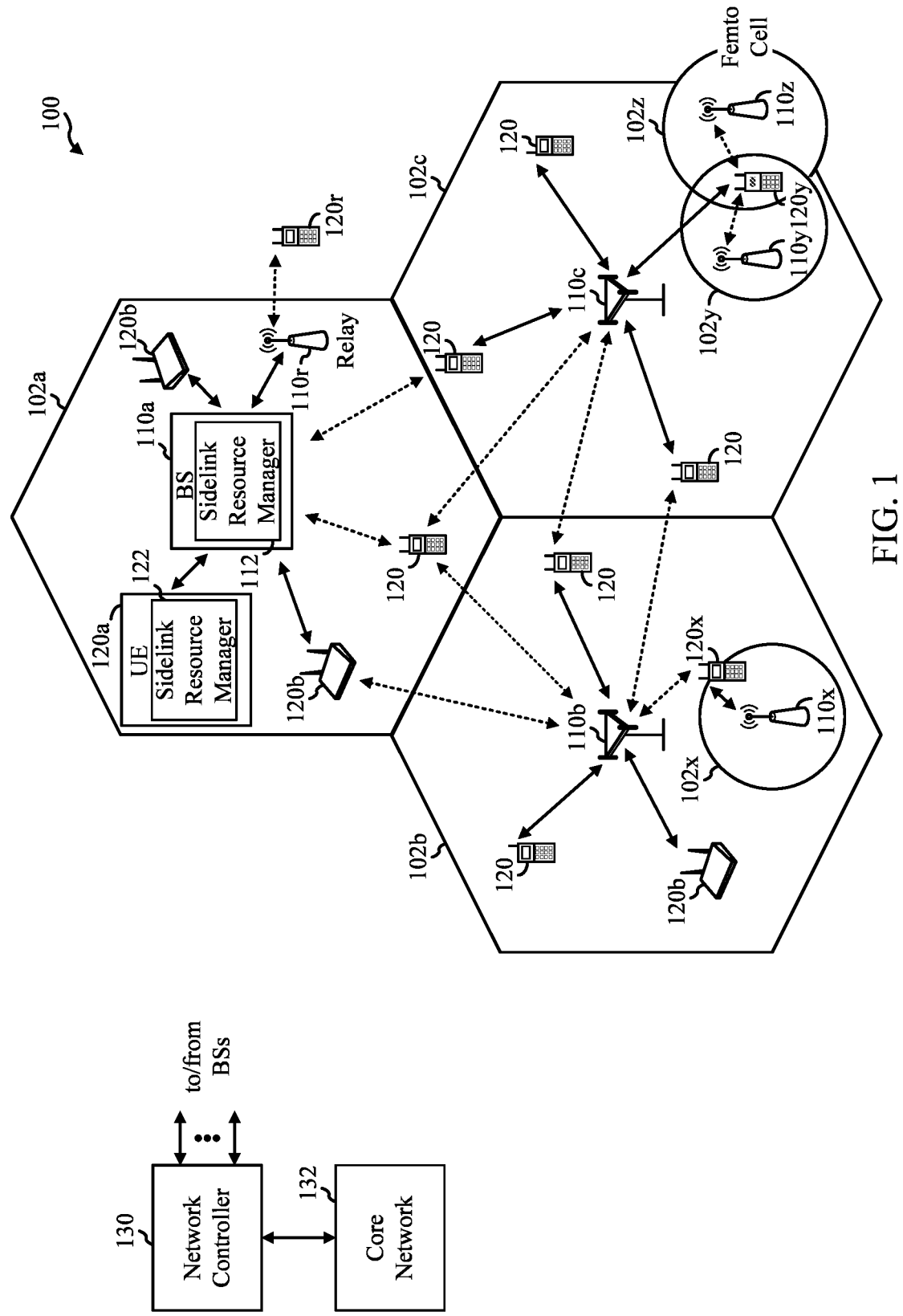
FIG. 1 is a block diagram conceptually illustrating an example wireless communication network, in accordance with certain aspects of the present disclosure.

Aspects of the present disclosure provide apparatus, methods, processing systems, and computer readable mediums for improved control of sidelink resources, including V2P, P2V, and more generally V2X resources, in a communication network.

The following description provides examples of improved control of sidelink resources in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

According to certain aspects, the BSs 110 may be configured for dynamically allocating sidelink resources, such as V2P, P2V, and more generally V2X resources, to UEs 120, which in some embodiments may include pedestrian user equipment (PUE) and vehicle user equipment (VUE), as discussed in more detail below with respect to FIGS. 4A and 4B. As shown in FIG. 1, the BS 110a includes a sidelink resource manager 112 that is configured to dynamically allocate sidelink resources, such as V2P, P2V, and more generally V2X resources, in accordance with aspects of the present disclosure. In some embodiments, sidelink resource manager 112 may be implemented additionally or alternatively in other network elements, such as a roadside unit (RSU), as described in more detail below with respect to FIGS. 4A and 4B. The UE 120a includes a sidelink resource manager 122 that is configured to interact with the network for controlling sidelink resources used by UE 120a, in accordance with aspects of the present disclosure. In some embodiments, UE 120a may be a pedestrian user equipment (PUE) or a vehicle user equipment (VUE), as described in more detail below with respect to FIGS. 4A and 4B.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120, 120a, 120b, 120r, 120x, and 120y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
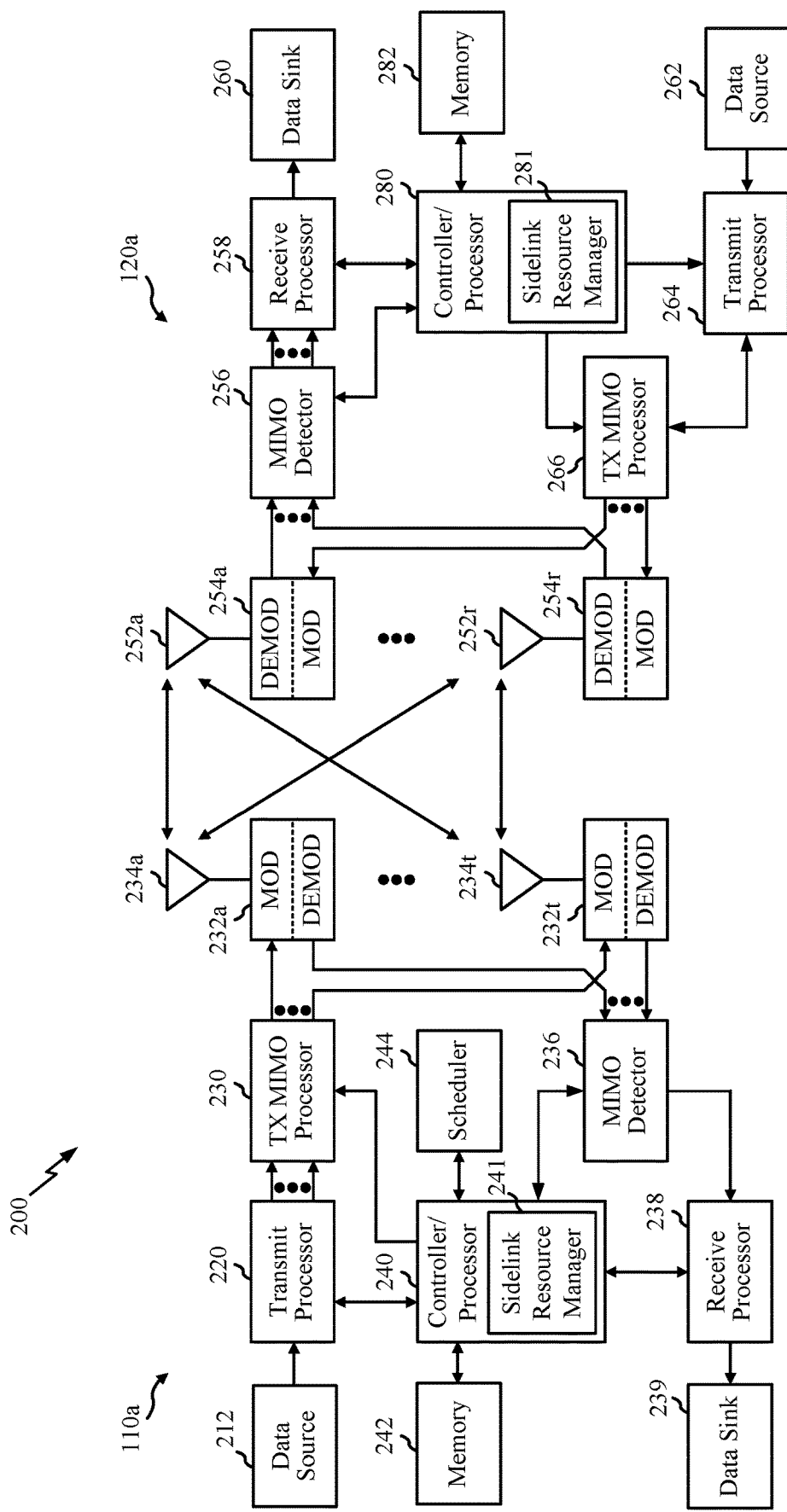
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a sidelink resource manager 241 that is configured to dynamically allocate sidelink resources, such as V2P, P2V, and more generally V2X resources, according to aspects described herein. As shown in FIG. 2, the controller/processor 280 of the UE 120a has a sidelink resource manager 281 that is configured to interact with the network (e.g., BS 110a) for controlling sidelink resources used by UE 120a, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
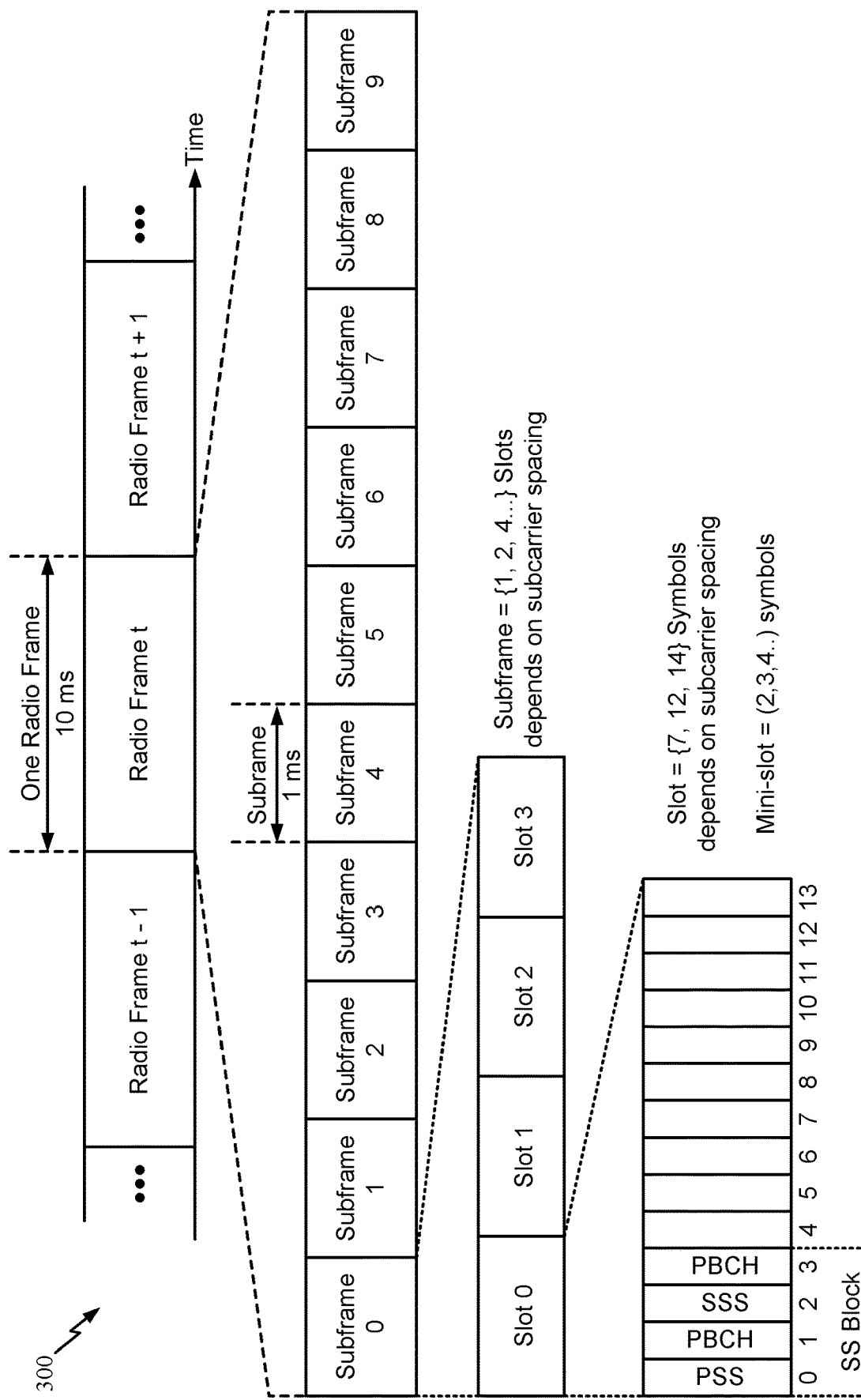
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, vehicle-to-pedestrian (V2P) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Example V2X System

Figure 4B:
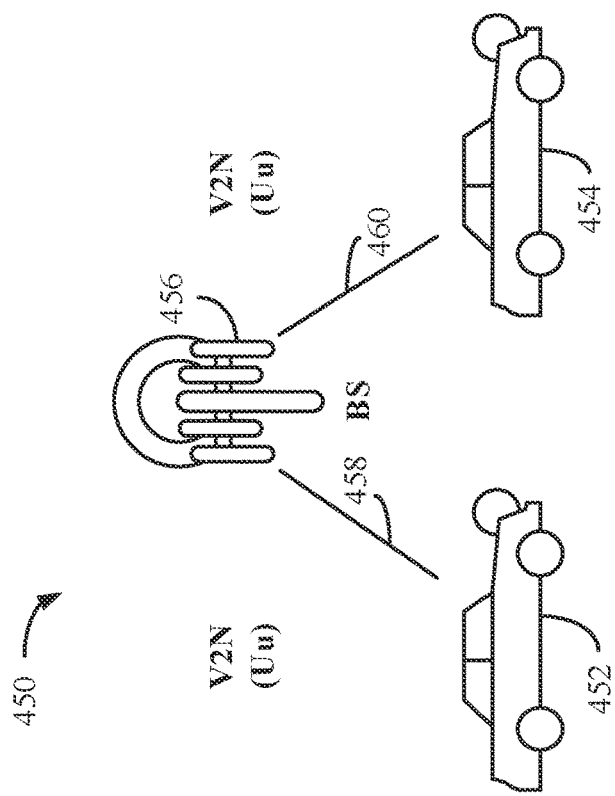
FIG. 4A and FIG. 4B show diagrammatic representations of example vehicle to everything (V2X) systems, in accordance with certain aspects of the present disclosure.
Figure 4A:
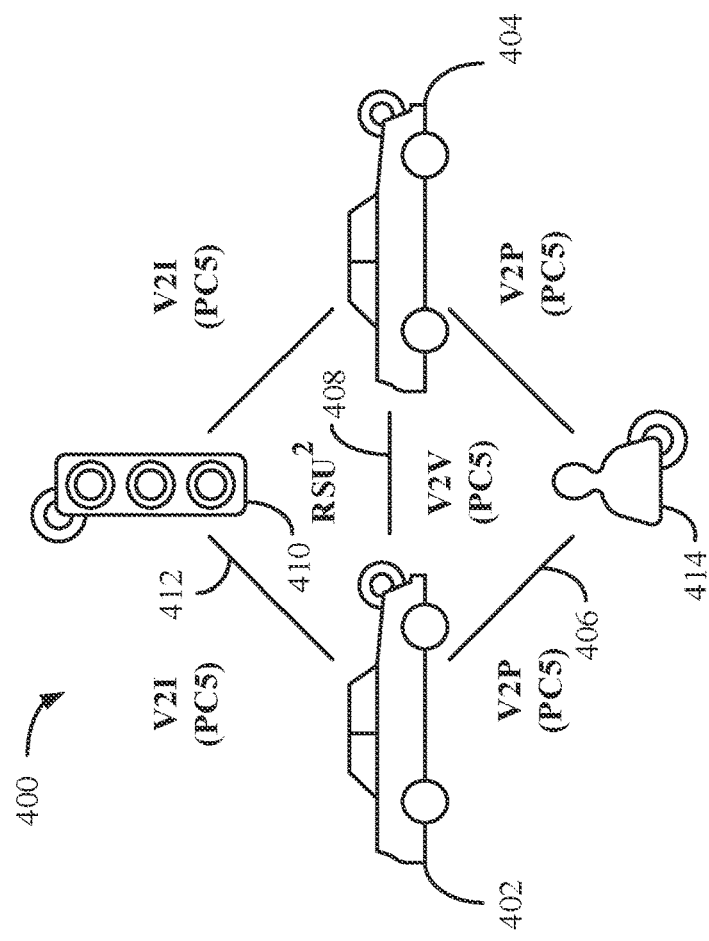

FIG. 4A and FIG. 4B show diagrammatic representations of example V2X systems, in accordance with some aspects of the present disclosure. For example, the vehicles shown in FIG. 4A and FIG. 4B may include vehicle user equipment (VUE) configured to communicate with other user equipment, such as pedestrian user equipment (PUE), and other network elements, such as roadside units (RSU), via sidelink channels, which may be dynamically configured as described herein.

The V2X systems, provided in FIG. 4A and FIG. 4B provide two complementary transmission modes. A first transmission mode, shown by way of example in FIG. 4A, involves direct communications (for example, also referred to as side link communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 is depicted including vehicle to vehicle (V2V) communications between vehicles 402 and 404 and vehicle to pedestrian communications (V2P) between vehicles 402, 404 and pedestrian user equipment 414 (e.g., a mobile device such as a smartphone). The first transmission mode allows for direct communication between different participants in a given geographic location.

As illustrated, a vehicle can have a wireless communication link 406 with a pedestrian (or other individual) (V2P) via a pedestrian's user equipment 414 through a sidelink, such as via a PC5 interface. Communications between the vehicles 402 and 404 may also occur through a PC5 interface 408.

In a like manner, V2I communication may occur from a vehicle 402 to a roadside network element 410, such as a traffic signal, sign, or other roadside unit through a PC5 interface 412. With respect to each communication link illustrated in FIG. 4A, two-way communication may take place between the various elements, therefore each element may be a transmitter and a receiver of information.

In some embodiments, as in FIG. 4A, roadside units (RSUs) may be utilized for V2X communications, such as V2I communications in this example. In some examples, an RSU may act as a forwarding network element to extend coverage for a UE. In some examples, an RSU may be co-located with a BS or may be standalone.

RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

In some embodiments, the V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B depicts another transmission mode for V2X system 450 for communication between a vehicle 452 and a vehicle 454 through a network element 456. These network communications may occur through discrete network elements, such as a BS (e.g., the BS 110a), that sends and receives information to and from (for example, relays information between) vehicles 452 and 454. The network communications through vehicle to network (V2N) links 458 and 460, which are examples of network access links (e.g., via Uu interfaces), may be used, for example, for long range communications between vehicles, such as for communicating the presence of a car accident a distance ahead along a road or highway. Other types of communications may be sent by the wireless network element 456 to vehicles, such as traffic flow conditions, road hazard warnings, environmental/weather reports, and service station availability, among other examples. In some embodiments, such data can be obtained from cloud-based sharing services.

Improving the Efficiency of V2X Systems with
Dynamic Sidelink Resource Allocation V2X systems, such as described with respect to the examples in FIGS. 4A and 4B, may greatly improve pedestrian safety in various environments, such as urban environments. For example, when a pedestrian is on a collision course with a vehicle, the vehicle may send a communication to the pedestrian (e.g., via the pedestrian's UE) to alert the pedestrian of the oncoming vehicle. Accordingly, various standards organizations (e.g., 3GPP) desire to implement communication standards for V2X systems to improve pedestrian safety.

However, additional functionality in any network communication system requires coordination and control to avoid overburdening network resources. In particular, existing wireless communication systems are already highly utilized, so adding additional features requiring additional messaging requires careful consideration to avoid reducing overall network performance.

For example, V2X resources, such as vehicle to pedestrian (V2P) and pedestrian to vehicle (P2V) resources, may be needed under certain conditions, but not under others. Consequently, static assignment of V2X resources, such as sidelink pool resources, may lead to underutilization of such resources under certain conditions. For example, whereas urban environments may be busy with vehicle and pedestrian traffic during daytime hours, the same environments may not be busy during very late night/early morning hours. Thus, network resource allocations during those two different sets of conditions need not be the same and, indeed, would be inefficient if the same.

Accordingly, the present disclosure presents various methods for dynamically controlling network resources, such as sidelink resources used in V2X systems, which improve the capabilities of the network without negatively affecting the performance of the network.

Example Dynamic Control of Sidelink Resource
Pools for V2X Messaging

Aspects of the present disclosure provide systems and methods for dynamically controlling sidelink resources for V2X messaging, such as P2V and V2P messaging.

Figure 5A:
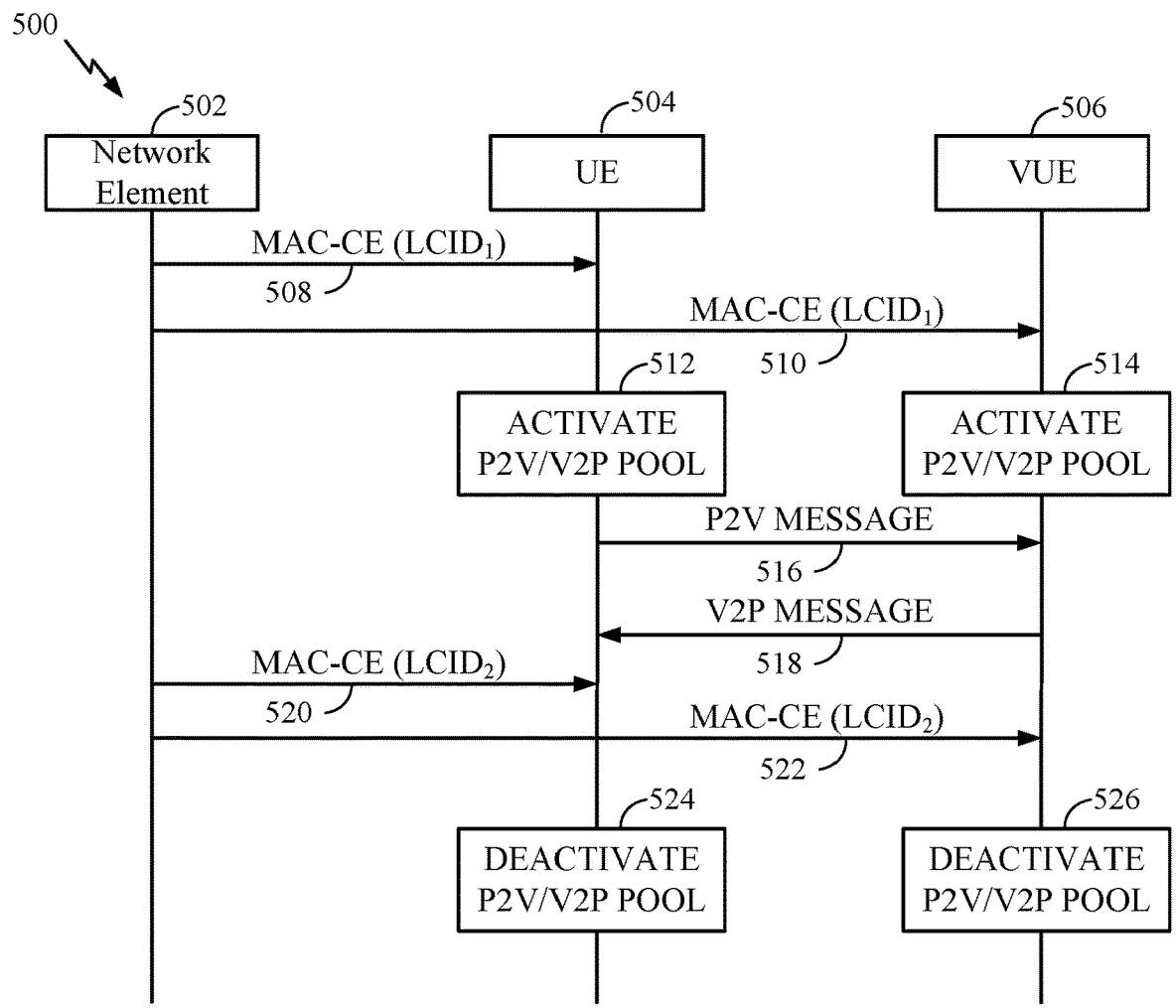
FIG. 5A depicts a call flow diagram illustrating example operations 500 for wireless communication, in accordance with certain aspects of the present disclosure.
Figure 5B:
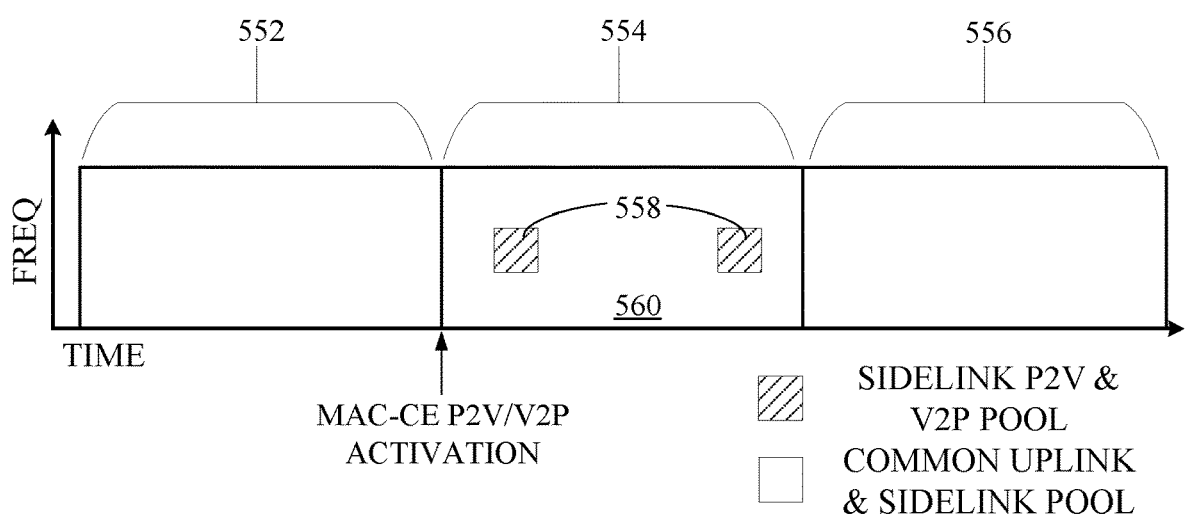
FIG. 5B depicts an example of selectively activating and deactivating P2V/V2P sidelink resource pools, in accordance with certain aspects of the present disclosure.

FIGS. 5A and 5B depict an example of dynamically activating and deactivating V2X resources, such as sidelink resources, including P2V/V2P resource pools.

In particular, FIG. 5A depicts a call flow diagram illustrating example operations 500 for wireless communication, in accordance with certain aspects of the present disclosure. The operations 500 may be performed between, for example, a network element, such as a base station (e.g., BS 110a of FIG. 1) or RSU (e.g., 410 of FIG. 4A) and a UE (e.g., the UE 120a in the wireless communication network 100 of FIG. 1 or PUE 414 in FIG. 4A) and/or VUE (e.g., 402 in FIG. 4A). Further, the operations 500 may be implemented as software components that are executed and run on one or more processors (e.g., controller/processors 241 and 280 of FIG. 2). Further, the transmission and reception of signals by the UE and network elements (e.g., a BS or RSU) in operations 500 may be enabled, for example, by one or more antennas (e.g., antennas 234a and 252a of FIG. 2).

The operations 500 begin at 508 with a network element 502 transmitting a message to a user equipment (UE) 504. In some embodiments, UE 504 may be a UE such as UE 120a in FIGS. 1 and 2, or a pedestrian UE, such as PUE 414 in FIG. 4A.

In this embodiment, the message at step 508 comprises a MAC control element (MAC-CE) that includes a first logical channel ID ($LCID_1$) configured to cause UE 504 to activate a pool of sidelink resources for P2V and V2P communications (generally, V2X resources). The P2V/V2P pool of sidelink resources may be a subset of a set of general sidelink resources, which may be preconfigured in UE 504 by a network.

Operations 500 then proceed to 510 with network element 502 transmitting a message to a vehicle user equipment (VUE) 506. In some embodiments, VUE 504 may be as described above with respect to vehicles 402, 404, 452, and 454 of FIGS. 4A and 4B.

In this embodiment, the message at step 510 comprises a MAC-CE that includes the first logical channel ID ($LCID_1$) configured to cause VUE 506 to activate a pool of sidelink resources for P2V and V2P communications. As above, the P2V/V2P pool of sidelink resources may be a subset of a set of general sidelink resources, which may be preconfigured in VUE 506 by the network.

Operations 500 then proceed to steps 512 and 514, where, in response to the messages at step 508 and 510, UE 504 and VUE 506 activate respective pools of P2V/V2P sidelink resources.

Operations 500 then proceed to steps 516 and 518 with UE 504 and VUE 506 exchanging messages directly using the P2V/V2P sidelink resource pool activated at steps 512 and 514. For example, the messages at steps 516 and 518 may be in regards to the proximity of a pedestrian carrying UE 504 to a vehicle carrying VUE 506 and operating near the pedestrian.

Operations 500 then proceed to steps 520 and 522 with network element 502 transmitting messages to UE 504 and VUE 506, respectively. In this embodiment, the messages at steps 520 and 522 comprise MAC-CEs that includes a second logical channel ID ($LCID_2$) configured to cause UE 504 and VUE 506 to deactivate the P2V/V2P sidelink resource pool.

In this example, two LCIDs ($LCID_1$ and $LCID_2$) carried within MAC-CEs are configured for activating and deactivating (respectively) the P2V/V2P sidelink resource pool. However, additional LCIDs and other types of control messages may be used to activate and deactivate the P2V/V2P sidelink resource pool. In some embodiments, various LCIDs may standardized, such as in a 3GPP technical standard section, for activating and deactivating P2V/V2P sidelink resource pools. For example, Tables 6.2.1-1 and 6.2.1-2 of TS 38.321 may include specific LCIDs related to configuration of sidelink resources, including P2V/V2P sidelink resource pools, as described with respect to this and other figures herein.

In some embodiments, network element 502 is a base station (e.g., BS 110a in FIGS. 1 and 2), and messages 508, 510, 520, and 522 may be, for example, downlink scheduling (DL-SCH) messages of an access link, such as via a Uu air interface, as depicted above in FIG. 4B. Alternatively, where network element 502 is a roadside unit (RSU) (e.g., RSU 410 in FIG. 4A), messages 508, 510, 520, and 522 may be, for example, physical sidelink shared channel (PSSCH) messages of a sidelink, such as via a PC5 air interface.

FIG. 5B depicts an example of selectively activating and deactivating P2V/V2P sidelink resource pools. In particular, during time period 552, the P2V/V2P sidelink resource pool is deactivated. Then, during time period 554, P2V/V2P sidelink resource pool 558 is activated, such as by steps 508-514 in FIG. 5A. Then, during time period 556, P2V/V2P sidelink resource pool 558 are deactivated, such as by steps 520-526 in FIG. 5A.

As depicted in FIG. 5B, P2V/V2P sidelink resource pool 558 is a subset of common sidelink resource pool 560.

As depicted with respect to operations 500 in FIG. 5A and more generally in FIG. 5B, a network element can dynamically control the activation and deactivation of network resources, such as P2V/V2P sidelink resources (generally, V2X sidelink resources). Thus operations 500 enable more efficient use of network resources based on conditions, such as, for example, the instant need for the P2V/V2P sidelink resources. As described above, the P2V/V2P sidelink resource pool may be enabled at certain times of day based on predicted activity and need or dynamically based on sensed need. For example, where a network sees a high number of connections of both UE and VUE in an area, the P2V/V2P sidelink resource pool may be activated. Notably, these are just a few examples, and many other are possible.

Figure 6A:
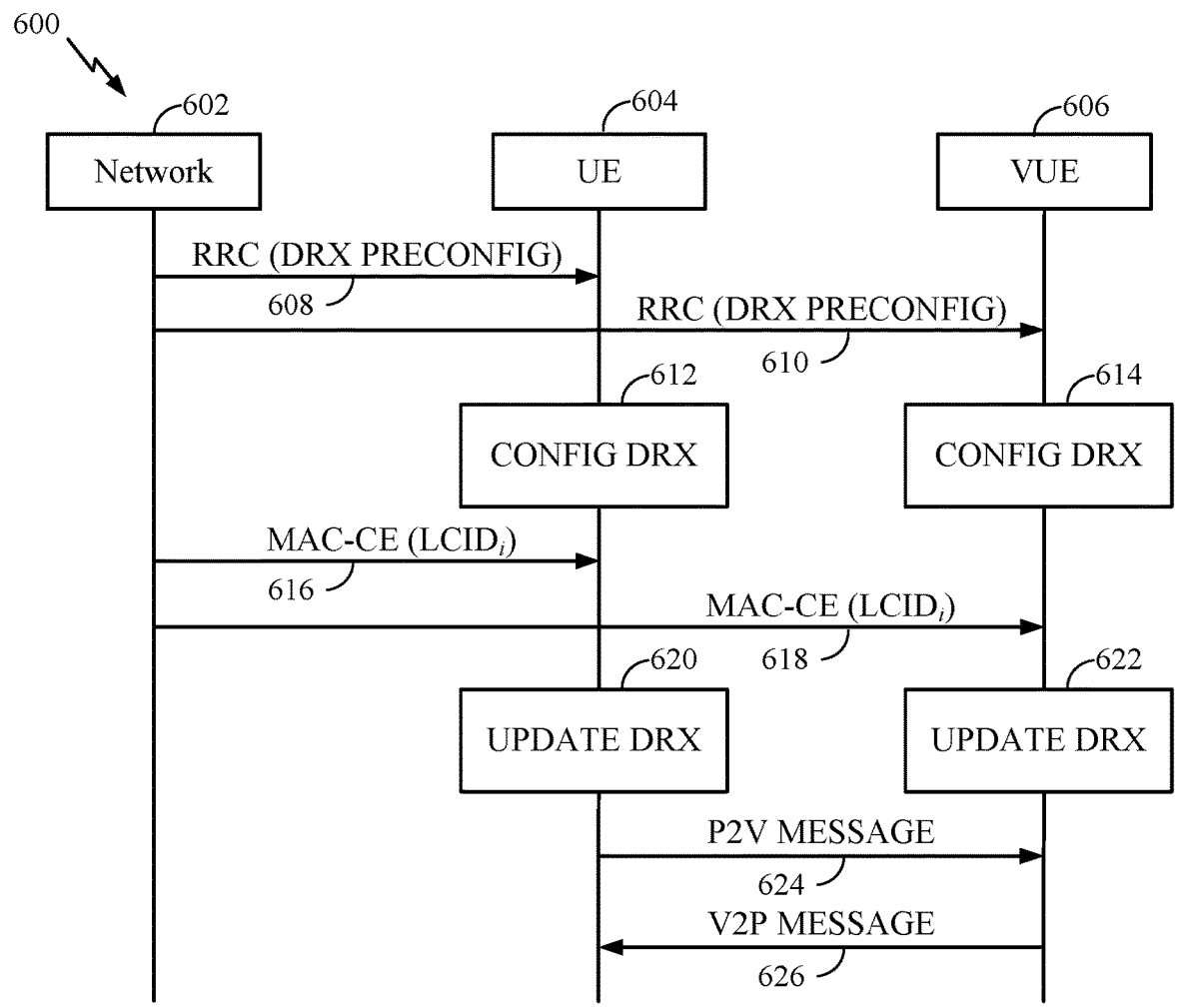
FIG. 6A depicts a call flow diagram illustrating example operations for wireless communication, in accordance with certain aspects of the present disclosure.
Figure 6B:
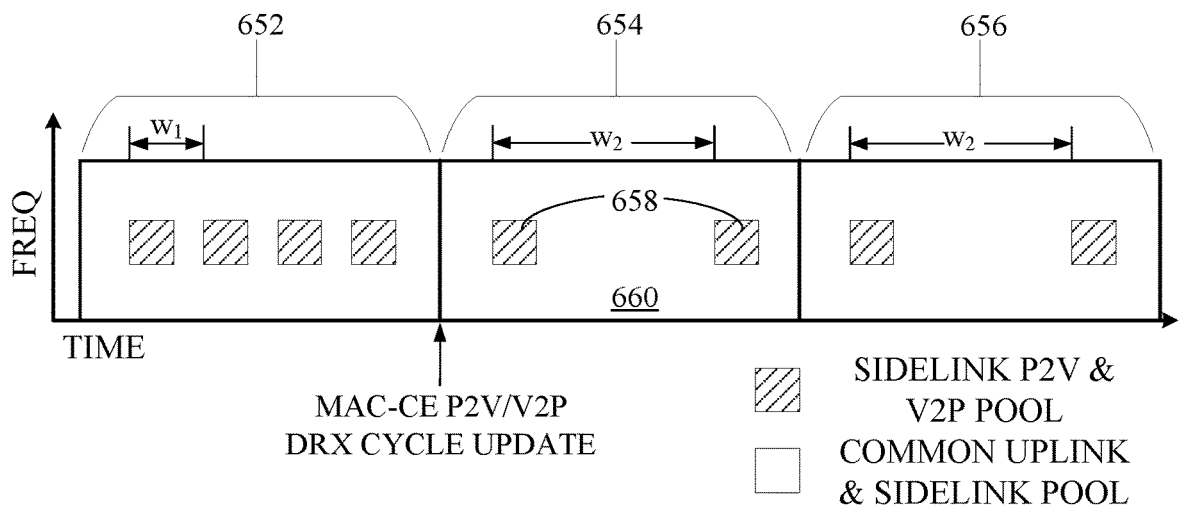
FIG. 6B depicts an example of selectively updating (or reconfiguring) DRX cycle characteristics for P2V/V2P sidelink resource pools, in accordance with certain aspects of the present disclosure.

FIGS. 6A and 6B depict another example of dynamically configuring V2X resources, such as sidelink resources, including P2V/V2P resource pools.

In particular, FIG. 6A depicts a call flow diagram illustrating example operations 600 for wireless communication, in accordance with certain aspects of the present disclosure. The operations 600 may be performed between, for example, a network element, such as a base station (e.g., BS 110a of FIG. 1) or RSU (e.g., 410 of FIG. 4A) and a UE (e.g., the UE 120a in the wireless communication network 100 of FIG. 1 or PUE 414 in FIG. 4A) and/or VUE (e.g., 402 in FIG. 4A). Further, the operations 600 may be implemented as software components that are executed and run on one or more processors (e.g., controller/processors 241 and 280 of FIG. 2). Further, the transmission and reception of signals by the UE and network elements (e.g., a BS or RSU) in operations 600 may be enabled, for example, by one or more antennas (e.g., antennas 234a and 252a of FIG. 2).

The operations 600 begin at steps 608 and 610 with a network element 602 transmitting messages to a user equipment (UE) 604 and vehicle user equipment (VUE) 606, respectively. In some embodiments, UE 604 may be a UE such as UE 120a in FIGS. 1 and 2, or a pedestrian UE, such as PUE 414 in FIG. 4A. In some embodiments, VUE 604 may be as described above with respect to vehicles 402, 404, 452, and 454 of FIGS. 4A and 4B.

In this embodiment, the messages at steps 608 and 610 comprise RRC messages that include DRX cycle preconfigurations for a pool of sidelink resources for P2V and V2P communications (generally, V2X resources) for UE 604 and VUE 606, respectively. The P2V/V2P pool of sidelink resources may be a subset of a set of general sidelink resources, which may be also be preconfigured in UE 604 and VUE 606 by a network.

Operations 600 then proceed to steps 612 and 614, where, in response to the messages at step 608 and 610, UE 604 and VUE 606 configure respective DRX cycles for their P2V/V2P sidelink resources. For example, UE 604 and VUE 606 may configure a DRX cycle length at steps 612 and 614, respectively.

Operations 600 then proceed to steps 616 and 618 with network element 602 transmitting messages to UE 604 and VUE 606, respectively, which comprise MAC-CEs that includes a logical channel ID (LCID$_i$) configured to cause UE 604 and VUE 606 to update (or reconfigure) their DRX cycles. For example, the LCIDs may cause UE 604 and VUE 606 to lengthen or shorten their DRX cycles (in other words, adjust the frequency of DRX periods). Notably, LCID$_i$ in steps 616 and 618 may be one of a number M of predetermined LCID$_i$'s where i∈{1 ... M}, where each LCID$_i$ may be preconfigured to cause a receiving device to change its DRX cycle in a prescribed manner. As above, in some embodiments, various LCIDs may standardized, such as in a 3GPP technical standard section, for selectively changing P2V/V2P sidelink resource pool DRX characteristics.

Operations 600 then proceed to steps 620 and 622, where, in response to the messages at step 616 and 618, UE 604 and VUE 606 update respective DRX cycles for their P2V/V2P sidelink resources. As above, the updated DRX cycles may be longer or shorter than the originally configured DRX cycles at steps 612 and 614, as depicted in FIG. 6B where the original cycle length $w_1$ in increased to $w_2$ in time periods 654 and 656.

Operations 600 then proceed to steps 624 and 626 with UE 604 and VUE 606 exchanging messages directly using the P2V/V2P sidelink resource pool in accordance with the DRX cycle updated at steps 620 and 622.

In some embodiments, network element 602 is a base station (e.g., BS 110a in FIGS. 1 and 2), and messages 616 and 618 may be, for example, downlink scheduling (DL-SCH) messages of an access link, such as via a Uu air interface, as depicted above in FIG. 4B. Alternatively, where network element 602 is a roadside unit (RSU) (e.g., RSU 410 in FIG. 4A), messages 616 and 618 may be, for example, physical sidelink shared channel (PSSCH) messages of a sidelink, such as via a PC5 air interface.

FIG. 6B depicts an example of selectively updating (or reconfiguring) DRX cycle characteristics for P2V/V2P sidelink resource pools. In particular, during time period 652, the P2V/V2P sidelink resource pool has a DRX cycle length of $w_1$. Then, during time periods 654 and 656, P2V/V2P sidelink resource pool has an updated DRX cycle length of $w_2$, which in this example is longer. The update to the DRX cycle for UE 604 and VUE 606 may be accomplished as above in steps 616-622 of FIG. 6A.

As depicted in FIG. 6B, P2V/V2P sidelink resource pool 658 is a subset of common sidelink resource pool 660.

As depicted with respect to operations 600 in FIG. 6A and more generally in FIG. 6B, a network element can dynamically control characteristics of network resources, such as the DRX periodicity of P2V/V2P sidelink resources (generally, V2X sidelink resources). Thus operations 600 enable more efficient use of network resources based on conditions, such as, for example, the instant need for the P2V/V2P sidelink resources.

For example, the DRX cycle time for P2V/V2P sidelink resources may be changed at certain times of day based on predicted activity and need or dynamically based on sensed need. For example, where a network sees a high number of connections of both UE and VUE in an area, the DRX cycle may be shortened so that more P2V/V2P sidelink resources are available in any given block of time, such as during period 652. Alternatively, where the network determines that there is less need, the DRX cycle may be lengthened so that fewer P2V/V2P sidelink resources are available in any given block of time, such as during periods 654 and 656, thereby saving power in battery powered mobile devices, such as UE 604, and preserving network physical resources for other functions. Notably, these are just a few examples, and many other are possible.

Figure 7A:
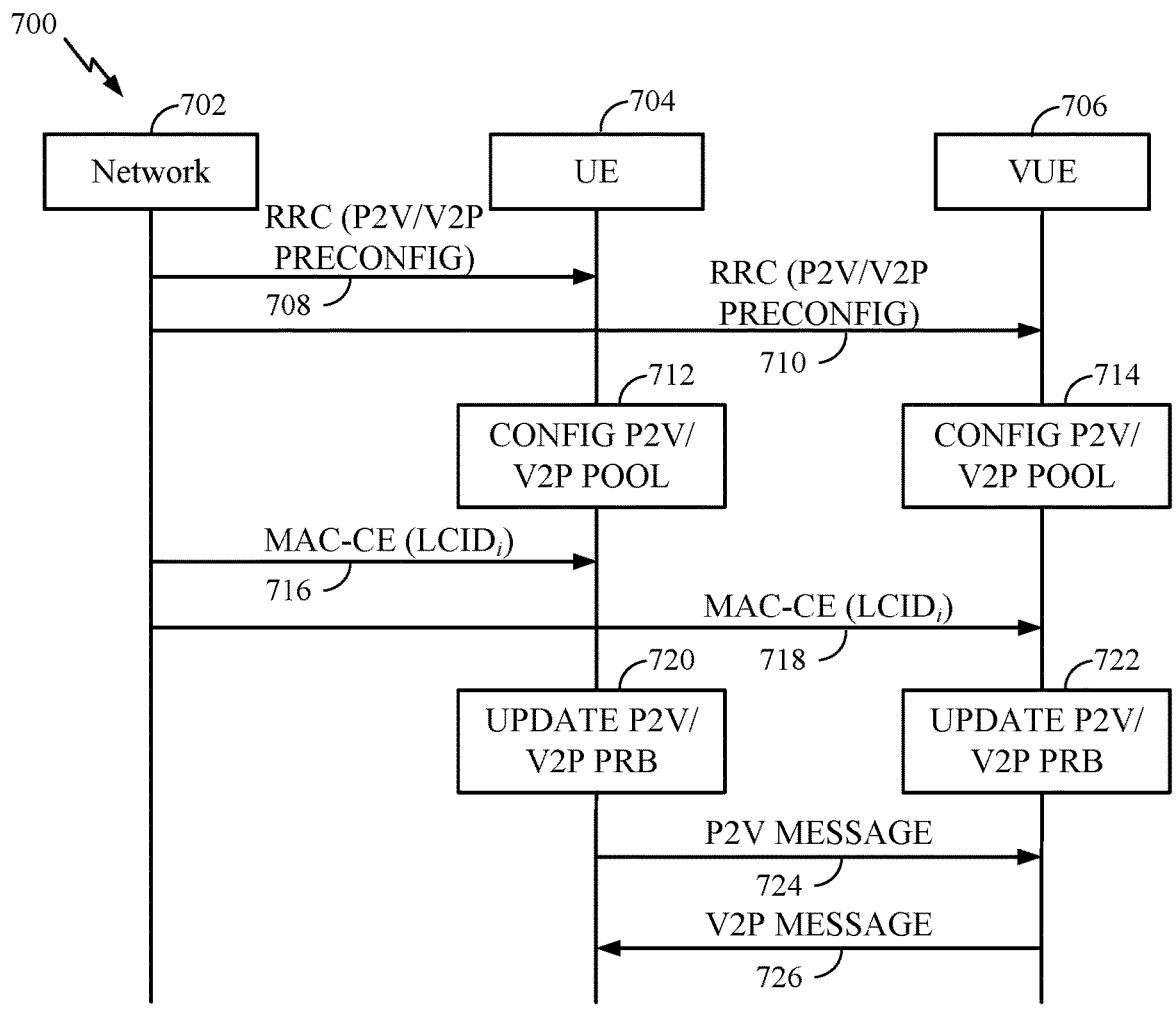
FIG. 7A depicts a call flow diagram illustrating example operations for wireless communication, in accordance with certain aspects of the present disclosure.
Figure 7B:
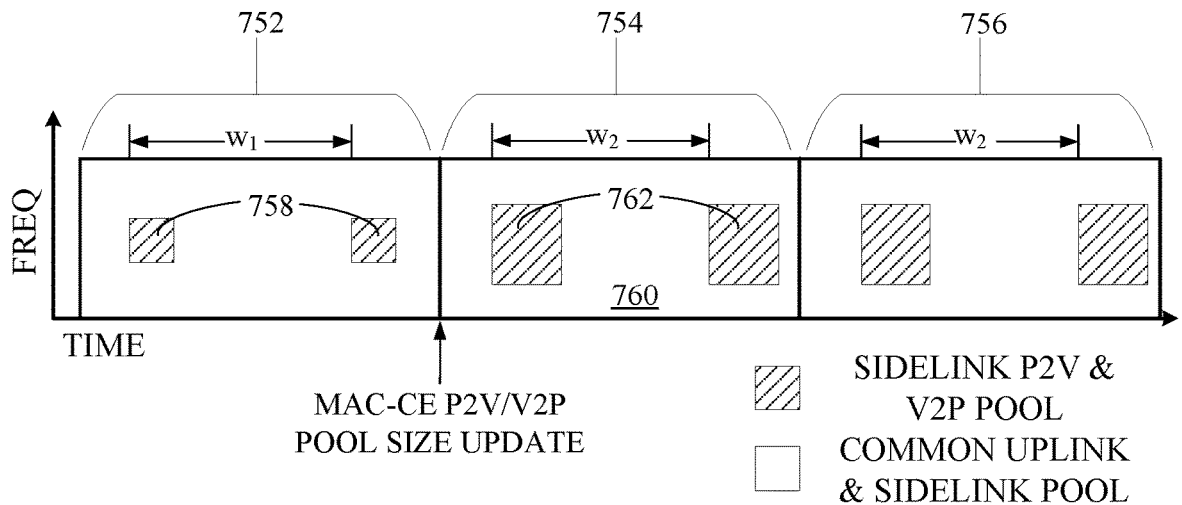
FIG. 7B depicts an example of selectively updating (or reconfiguring) physical characteristics for P2V/V2P sidelink resource pools, in accordance with certain aspects of the present disclosure.

FIGS. 7A and 7B depict another example of dynamically configuring V2X resources, such as sidelink resources, including P2V/V2P resource pools.

In particular, FIG. 7A depicts a call flow diagram illustrating example operations 700 for wireless communication, in accordance with certain aspects of the present disclosure. The operations 700 may be performed between, for example, a network element, such as a base station (e.g., BS 110*a* of FIG. 1) or RSU (e.g., 410 of FIG. 4A) and a UE (e.g., the UE 120*a* in the wireless communication network 100 of FIG. 1 or PUE 414 in FIG. 4A) and/or VUE (e.g., 402 in FIG. 4A). Further, the operations 700 may be implemented as software components that are executed and run on one or more processors (e.g., controller/processors 241 and 280 of FIG. 2). Further, the transmission and reception of signals by the UE and network elements (e.g., a BS or RSU) in operations 700 may be enabled, for example, by one or more antennas (e.g., antennas 234*a* and 252*a* of FIG. 2).

The operations 700 begin at 708 and 710 with a network element 702 transmitting messages to a user equipment (UE) 704 and vehicle user equipment (VUE) 706, respectively. In some embodiments, UE 704 may be a UE such as UE 120*a* in FIGS. 1 and 2, or a pedestrian UE, such as PUE 414 in FIG. 4A. In some embodiments, VUE 704 may be as described above with respect to vehicles 402, 404, 452, and 454 of FIGS. 4A and 4B.

In this embodiment, the messages at steps 708 and 710 comprise RRC messages that include P2V/V2P sidelink resource pool preconfigurations for a pool of sidelink resources for P2V and V2P communications (generally, V2X resources) for UE 704 and VUE 706, respectively. The P2V/V2P pool of sidelink resources may be a subset of a set of general sidelink resources, which may be also be preconfigured in UE 704 and VUE 706 by a network.

Operations 700 then proceed to steps 712 and 714, where, in response to the messages at step 708 and 710, UE 704 and VUE 706 configure their respective P2V/V2P sidelink resource pools. For example, UE 704 and VUE 706 may configure an initial set of physical resource blocks as indicated at 758 in FIG. 7B. The set of physical resource blocks (PRBs) may be defined by number of contiguous resource blocks (e.g., 2 PRBs) and by specific time and frequency allocations for each physical resource block, which gives the PRBs a "shape" when plotted with respect to time and frequency.

Operations 700 then proceed to steps 716 and 718 with network element 702 transmitting messages to UE 704 and VUE 706, respectively, which comprise MAC-CEs that includes a logical channel ID (LCID$_i$) configured to cause UE 704 and VUE 706 to update (or reconfigure) their respective P2V/V2P sidelink resource pools. For example, the LCIDs may cause UE 704 and VUE 706 to change characteristics of their P2V/V2P sidelink resource pools, such as the number of PRBs and/or the shape of PRBs (with respect to time and frequency allocations). Notably, LCID$_i$ in steps 716 and 718 may be one of a number N of predetermined LCD: s where i∈{1 . . . N}, where each LCID$_i$ may be preconfigured to cause a receiving device to change its P2V/V2P sidelink resource pool in a prescribed manner. As above, in some embodiments, various LCIDs may standardized, such as in a 3GPP technical standard section, for selectively changing P2V/V2P sidelink resource pool physical allocation characteristics.

Operations 700 then proceed to steps 720 and 722, where, in response to the messages at step 716 and 718, UE 704 and VUE 706 update characteristics of their P2V/V2P sidelink resource pools, respectively. As above, the updated P2V/V2P sidelink resource pools may include more or fewer physical resources and different time and/or frequencies compared to the P2V/V2P sidelink resource pools configured at steps 712 and 714. For example, as depicted in FIG. 7B, initially configured P2V/V2P sidelink resource pools 758 during period 752 may be modified at steps 720 and 722 to include more physical resources, such as in P2V/V2P sidelink resource pools 762 during periods 754 and 756.

Operations 700 then proceed to steps 724 and 726 with UE 704 and VUE 706 exchanging messages directly using the P2V/V2P sidelink resource pool in accordance with the updated characteristics at steps 720 and 722.

In some embodiments, network element 702 is a base station (e.g., BS 110*a* in FIGS. 1 and 2), and messages 716 and 718 may be, for example, downlink scheduling (DL-SCH) messages of an access link, such as via a Uu air interface, as depicted above in FIG. 4B. Alternatively, where network element 702 is a roadside unit (RSU) (e.g., RSU 410 in FIG. 4A), messages 716 and 718 may be, for example, physical sidelink shared channel (PSSCH) messages of a sidelink, such as via a PC5 air interface.

FIG. 7B depicts an example of selectively updating (or reconfiguring) physical characteristics for P2V/V2P sidelink resource pools. In particular, during time period 752, the P2V/V2P sidelink resource pool have time and frequency allocations as depicted at 758. Then, during time periods 754 and 756, P2V/V2P sidelink resource pool have update time and frequency allocations, which in this example are greater in number than in period 752. The update to the physical characteristics of the P2V/V2P sidelink resource pool for UE 704 and VUE 706 may be accomplished as above in steps 716-722 of FIG. 7A.

As depicted in FIG. 7B, P2V/V2P sidelink resource pools 758 and 762 are a subset of common sidelink resource pool 760.

As depicted with respect to operations 700 in FIG. 7A and more generally in FIG. 7B, a network element can dynamically control characteristics of network resources, such as the physical resource allocations for P2V/V2P sidelink resources (generally, V2X sidelink resources). Thus operations 700 enable more efficient use of network resources based on conditions, such as, for example, the instant need for the P2V/V2P sidelink resources.

For example, the amount of physical P2V/V2P sidelink resources may be changed at certain times of day based on predicted activity and need or dynamically based on sensed need. For example, where a network sees a high number of connections of both UE and VUE in an area, the amount of physical P2V/V2P sidelink resources may be increased to service the large number of UE and VUE that may be interacting. Alternatively, where the network determines that there is less need, the amount of physical P2V/V2P sidelink resources may be reduced, thereby saving power in battery powered mobile devices, such as UE 704, and preserving network physical resources for other functions. Notably, these are just a few examples, and many other are possible.

Figure 8:
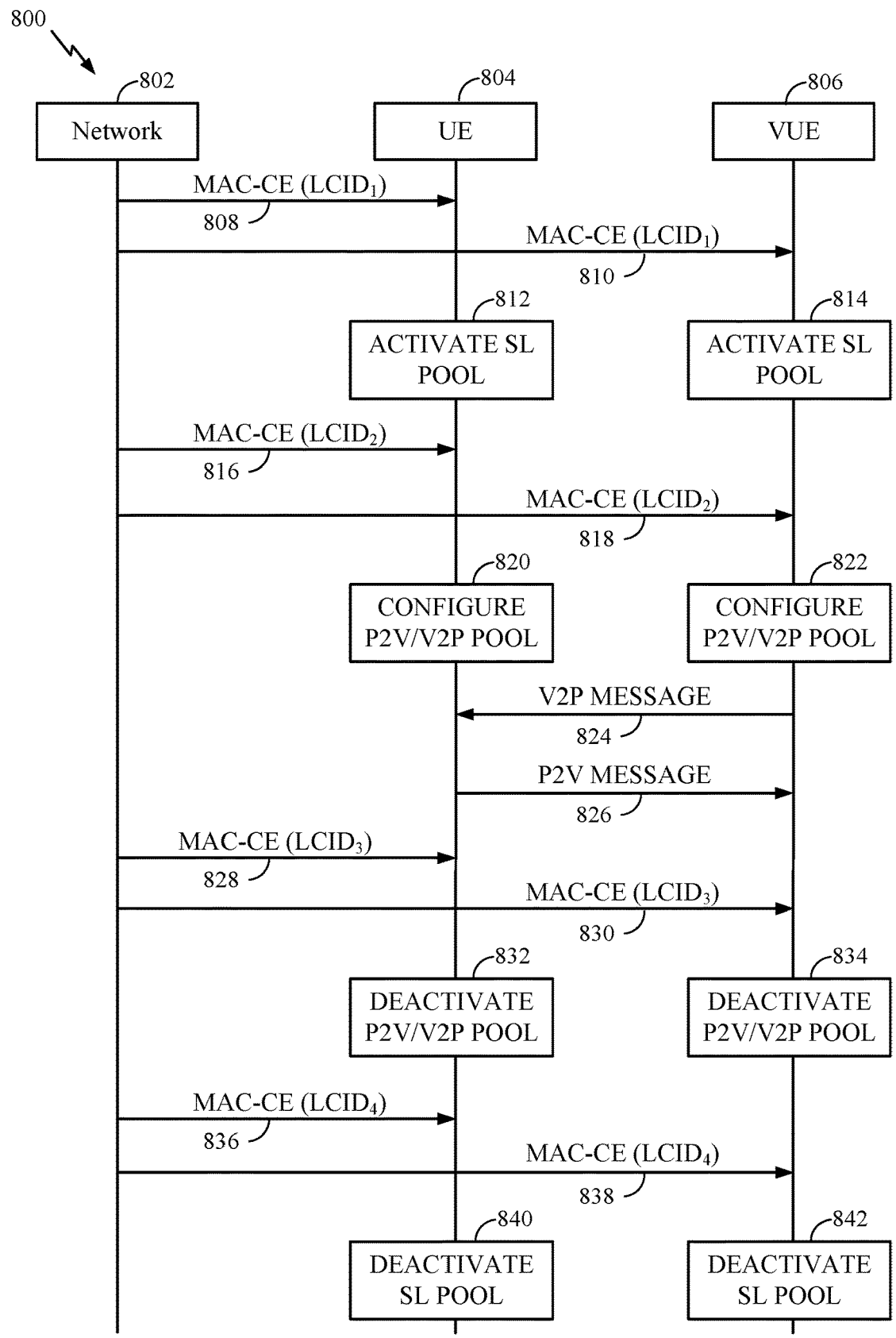
FIG. 8 depicts another example of dynamically reconfiguring V2X resources, such as sidelink resources, including P2V/V2P resource pools, in accordance with certain aspects of the present disclosure.

FIG. 8 depicts another example of dynamically configuring V2X resources, such as sidelink resources, including P2V/V2P resource pools.

In particular, FIG. 8 depicts a call flow diagram illustrating example operations 800 for wireless communication, in accordance with certain aspects of the present disclosure. The operations 800 may be performed between, for example, a network element, such as a base station (e.g., BS 110*a* of FIG. 1) or RSU (e.g., 410 of FIG. 4A) and a UE (e.g., the UE 120*a* in the wireless communication network 100 of FIG. 1 or PUE 414 in FIG. 4A) and/or VUE (e.g., 402 in FIG. 4A). Further, the operations 800 may be implemented as software components that are executed and run on one or more processors (e.g., controller/processors 241 and 280 of FIG. 2). Further, the transmission and reception of signals by the UE and network elements (e.g., a BS or RSU)

in operations 800 may be enabled, for example, by one or more antennas (e.g., antennas 234a and 252a of FIG. 2).

The operations 800 begin at 808 and 810 with a network element 802 transmitting messages to a user equipment (UE) 804 and vehicle user equipment 806 (VUE), respectively. In some embodiments, UE 804 may be a UE such as UE 120a in FIGS. 1 and 2, or a pedestrian UE, such as PUE 414 in FIG. 4A. In some embodiments, VUE 806 may be as described above with respect to vehicles 402, 404, 452, and 454 of FIGS. 4A and 4B.

In this embodiment, the messages at steps 808 and 810 comprise a MAC control elements (MAC-CEs) that includes a first logical channel ID ($LCID_1$) configured to cause UE 804 and VUE 806 to activate a pool of sidelink resources. In some embodiments, the pool of sidelink resources may be referred to as a common pool of sidelink resources Operations 800 then proceed to steps 812 and 814, where, in response to the messages at step 808 and 810, UE 804 and VUE 806 configure their respective sidelink resource pools.

Operations 800 then proceed to steps 816 and 818 with network element 802 transmitting messages to UE 804 and VUE 806, respectively, which comprise MAC-CEs that include a second logical channel ID ($LCID_2$) configured to cause UE 804 and VUE 806 to activate their pools of P2V/V2P sidelink resources. The P2V/V2P pools of sidelink resources may be a subset of a set of common sidelink resources, such as those activated at steps 812 and 814 for UE 804 and VUE 806, respectively.

Operations 800 then proceed to steps 820 and 822, where, in response to the messages at step 816 and 818, UE 804 and VUE 806 configure their respective P2V/V2P sidelink resource pools, such as by activating them and/or configuring their operating parameters (e.g., DRX cycle, time and frequency allocation, etc.).

Operations 800 then proceed to steps 824 and 826 with UE 804 and VUE 806 exchanging messages directly using the P2V/V2P sidelink resource pool in accordance with the configuration at steps 820 and 822.

Operations 800 then proceed to steps 828 and 830 with network element 802 transmitting messages to UE 804 and VUE 806, respectively, which comprise MAC-CEs that include a third logical channel ID ($LCID_3$) configured to cause UE 804 and VUE 806 to deactivate their pools of P2V/V2P sidelink resource pools.

Operations 800 then proceed to steps 832 and 834, where, in response to the messages at step 828 and 830, UE 804 and VUE 806 deactivate their respective P2V/V2P sidelink resource pools. Notably, while the P2V/V2P sidelink resource pools are deactivate in steps 832 and 834, the common sidelink resources are still active. Thus, the network can control the activation and deactivation of subsets of sidelink resources.

Operations 800 then proceed to steps 836 and 838 with network element 802 transmitting messages to UE 804 and VUE 806, respectively, which comprise MAC-CEs that include a fourth logical channel ID ($LCID_4$) configured to cause UE 804 and VUE 806 to deactivate their sidelink resource pools.

Operations 800 then proceed to steps 840 and 842, where, in response to the messages at step 836 and 838, UE 804 and VUE 806 deactivate their respective sidelink resource pools.

While not depicted in FIG. 8, operations 800 may include any of the other operations described with respect to FIGS. 5A-7B. For example, after activating the respective P2V/V2P sidelink resource pools in steps 820 and 822, the network could further configure the P2V/V2P sidelink resource pools, such as changing a DRX cycle or allocation of physical resources associated with the P2V/V2P sidelink resource pools.

In some embodiments, network element 802 is a base station (e.g., BS 110a in FIGS. 1 and 2), and messages 808, 810, 816, 818, 828, 830, 836, and 838 may be, for example, downlink scheduling (DL-SCH) messages of an access link, such as via a Uu air interface, as depicted above in FIG. 4B. Alternatively, where network element 802 is a roadside unit (RSU) (e.g., RSU 410 in FIG. 4A), messages 808, 810, 816, 818, 828, 830, 836, and 838 may be, for example, physical sidelink shared channel (PSSCH) messages of a sidelink, such as via a PC5 air interface.

Notably, the first through forth LCIDs in steps 808 and 810 ($LCID_1$), 816 and 818 ($LCID_2$), 828 and 830 ($LCID_3$), and 836 and 838 ($LCID_4$) may be one of a number X of predetermined $LCID_i$'s where $i \in \{1 \ldots X\}$, where each $LCID_i$ may be preconfigured to cause a receiving device to activate or deactivate sidelink resource, including subsets of sidelink resources, in a prescribed manner. As above, in some embodiments, various LCIDs may standardized, such as in a 3GPP technical standard section, for selectively changing P2V/V2P sidelink resource pool physical allocation characteristics.

As depicted with respect to operations 800 in FIG. 8, a network element can dynamically control use of network resources, such use of sidelink resources generally and P2V/V2P sidelink resources more specifically. Thus operations 800 enable more efficient use of network resources based on conditions, such as, for example, the instant need for the P2V/V2P sidelink resources. As above, this dynamic control can configure the use of sidelink resources to meet current network demands, and therefore improve battery life in battery powered mobile devices and improve network availability by deactivating sidelink resources in response to changes in network demand.

Figure 9A:
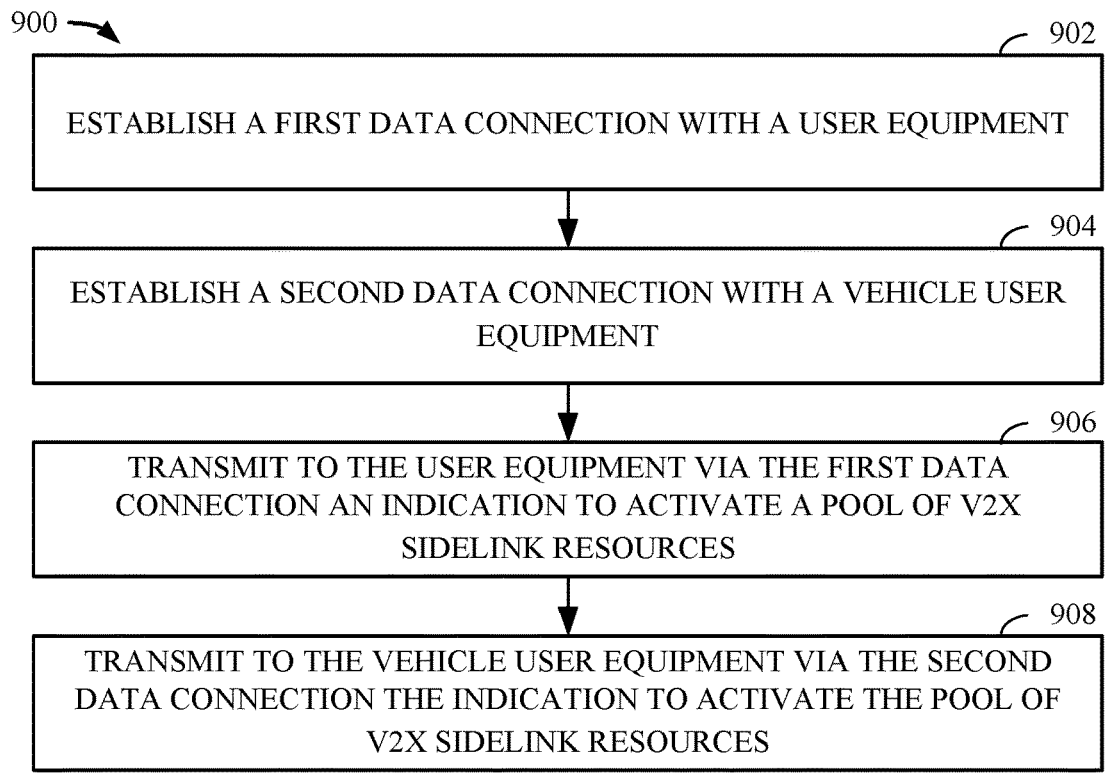
FIGS. 9A-9B depict example methods for configuring resources in a communication network, in accordance with certain aspects of the present disclosure.

Example Methods of Dynamically Controlling Sidelink Resource Pools for V2X Messaging FIG. 9A depicts an example method 900 for configuring resources in a communication network.

Method 900 begins at step 902 with establishing a first data connection with a user equipment.

Method 900 then proceeds to step 904 with establishing a second data connection with a vehicle user equipment.

Method 900 then proceeds to step 906 with transmitting to the user equipment via the first data connection an indication to activate a pool of V2X sidelink resources.

Method 900 then proceeds to step 908 with transmitting to the vehicle user equipment via the second data connection the indication to activate the pool of V2X sidelink resources.

In some embodiments of method 900, the indication to activate the pool of V2X sidelink resources comprises a first logical channel ID, and the first logical channel ID comprises a bit string in a header of a MAC control element.

Some embodiments of method 900 further include transmitting to the user equipment via the first data connection an indication to deactivate the pool of V2X sidelink resources.

Some embodiments of method 900 further include transmitting to the vehicle user equipment via the second data connection the indication to deactivate the pool of V2X sidelink resources.

In some embodiments of method 900, the indication to deactivate the pool of V2X sidelink resources comprises a second logical channel ID, and the second logical channel ID comprises a bit string in a header of a MAC control element.

In some embodiments of method 900, the first data connection with the user equipment comprises a first access link and the second data connection with the vehicle user equipment comprises a second access link.

In some embodiments of method 900, transmitting to the user equipment via the first data connection the indication to activate the pool of V2X sidelink resources comprises transmitting the indication to activate the pool of V2X sidelink resources via a downlink shared channel (DL-SCH) of the first access link, and transmitting to the vehicle user equipment via the second data connection the indication to activate the pool of V2X sidelink resources comprises transmitting the indication to activate the pool of V2X sidelink resources via a downlink shared channel of the second access link.

In some embodiments of method 900 the first access link and the second access link comprise Uu air interfaces.

In some embodiments of method 900, the first data connection with the user equipment comprises a first sidelink, and the second data connection with the vehicle user equipment comprises a second sidelink.

In some embodiments of method 900, transmitting to the user equipment via the first data connection the indication to activate the pool of V2X sidelink resources comprises transmitting the indication to activate the pool of V2X sidelink resources via a physical sidelink shared channel (PSSCH) of the first sidelink, and transmitting to the vehicle user equipment via the second data connection the indication to activate the pool of V2X sidelink resources comprises transmitting the indication to activate the pool of V2X sidelink resources via a physical sidelink shared channel of the second sidelink.

In some embodiments of method 900, the first sidelink and the second sidelink comprise PC5 air interfaces.

In some embodiments, method 900 is performed by a network element, such as a base station (e.g., BS 110*a* of FIG. 1) or RSU (e.g., 410 of FIG. 4A).

Figure 9B:
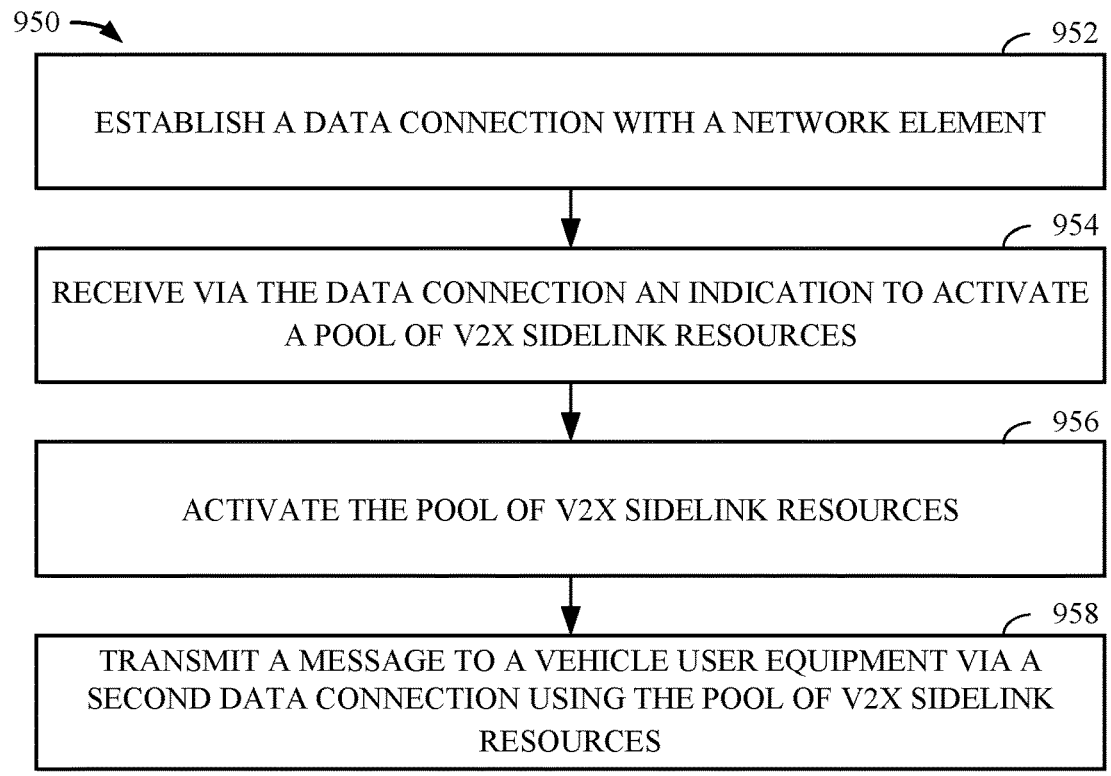

FIG. 9B depicts another example method 950 for configuring resources in a communication network.

Method 950 begins at step 952 with establishing a data connection with a network element.

Method 950 then proceeds to step 954 with receiving via the data connection an indication to activate a pool of V2X sidelink resources.

Method 950 then proceeds to step 956 with activating the pool of V2X sidelink resources.

Method 950 then proceeds to step 958 with transmitting a message to a vehicle user equipment via a second data connection using the pool of V2X sidelink resources.

In some embodiments of method 950, the indication to activate the pool of V2X sidelink resources comprises a first logical channel ID, and the first logical channel ID comprises a bit string in a header of a MAC control element.

Some embodiments of method 950 further include receiving from the network element via the data connection an indication to deactivate the pool of V2X sidelink resources; and deactivating the pool of V2X sidelink resources.

In some embodiments of method 950, the indication to deactivate the pool of V2X sidelink resources comprises a second logical channel ID, and the second logical channel ID comprises a bit string in a header of a MAC control element.

In some embodiments of method 950, the data connection with the network element comprises an access link, and receiving via the data connection the indication to activate the pool of V2X sidelink resources comprises receiving the indication to activate the pool of V2X sidelink resources via a downlink shared channel of the access link.

In some embodiments of method 950, the network element comprises a base station, and the access link comprises a Uu air interface.

In some embodiments of method 950, the network element comprises a roadside unit, and the data connection with the network element comprises a sidelink. In some embodiments of method 950, the sidelink comprises a PC5 air interface.

In some embodiments, method 950 is performed by and a UE (e.g., the UE 120*a* in the wireless communication network 100 of FIG. 1 or PUE 414 in FIG. 4A) and/or VUE (e.g., 402 in FIG. 4A).

Figure 10A:
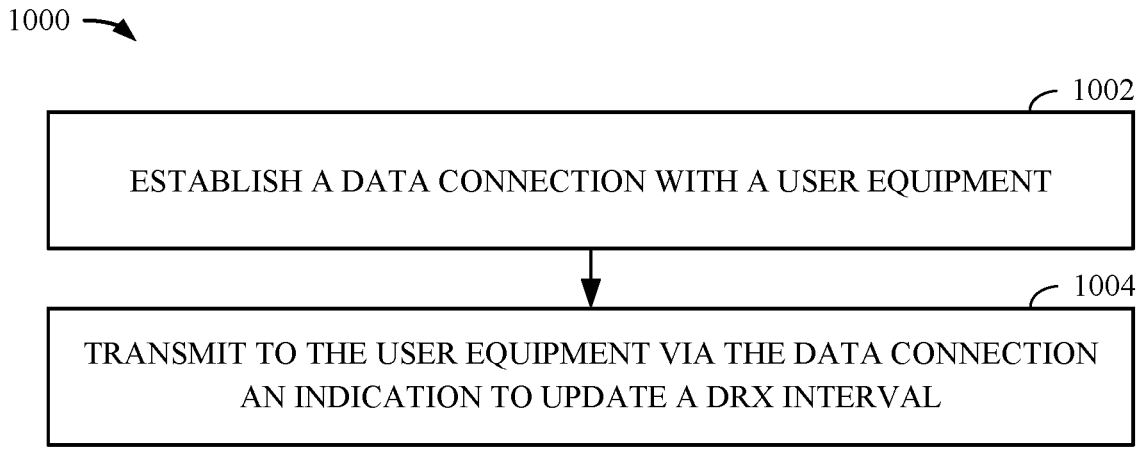
FIGS. 10A-10B depict further example methods for configuring resources in a communication network, in accordance with certain aspects of the present disclosure.

FIG. 10A depicts another example method 1000 for configuring resources in a communication network.

Method 1000 begins at step 1002 with establishing a data connection with a user equipment.

Method 1000 then proceeds to step 1004 with transmitting to the user equipment via the data connection an indication to update a DRX interval.

In some embodiments, of method 1000, the indication to update a DRX interval comprises a logical channel ID, and the logical channel ID comprises a bit string in a header of a MAC control element.

In some embodiments, of method 1000, the data connection comprises an access link of a Uu air interface.

In some embodiments, of method 1000, the data connection comprises a sidelink of a PC5 air interface.

In some embodiments, method 1000 is performed by a network element, such as a base station (e.g., BS 110*a* of FIG. 1) or RSU (e.g., 410 of FIG. 4A).

Figure 10B:
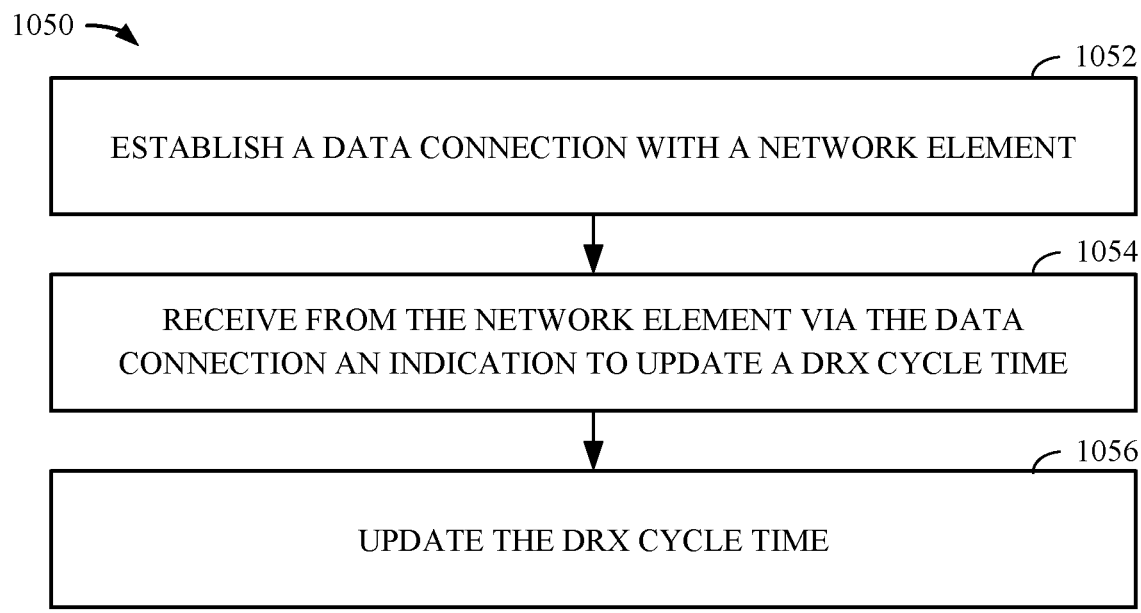

FIG. 10B depicts another example method 1050 for configuring resources in a communication network.

Method 1050 begins at step 1052 with establishing a data connection with a network element.

Method 1050 then proceeds to step 1054 with receiving from the network element via the data connection an indication to update a DRX cycle time. In some embodiments of method 1050, the indication to update the DRX cycle time comprises a logical channel ID, and the logical channel ID comprises a bit string in a header of a MAC control element.

Method 1050 then proceeds to step 1056 with updating the DRX cycle time.

Some embodiments of method 1050 further include entering a DRX period according to the updated DRX cycle time.

Some embodiments of method 1050 further include waiting a preconfigured number of time slots after receiving the indication to update the DRX cycle time before entering the DRX period.

Some embodiments of method 1050 further include receiving from the network element via an RRC message, the preconfigured number of time slots.

In some embodiments of method 1050, the network element comprises a base station, and the data connection comprises an access link of a Uu air interface.

In some embodiments of method 1050, the network element comprises a roadside unit, and the data connection comprises a sidelink of a PC5 air interface.

In some embodiments, method 1050 is performed by and a UE (e.g., the UE 120*a* in the wireless communication network 100 of FIG. 1 or PUE 414 in FIG. 4A) and/or VUE (e.g., 402 in FIG. 4A).

Figure 11A:
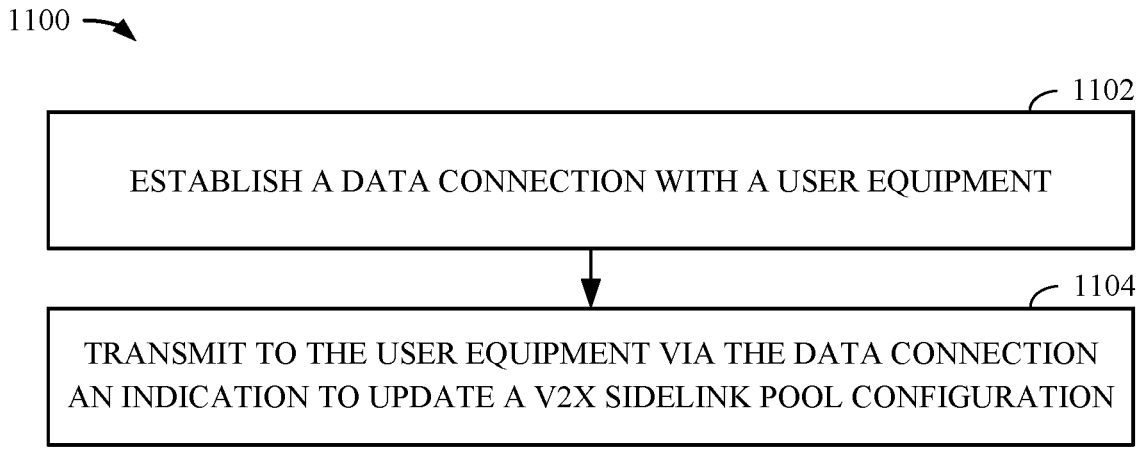
FIGS. 11A-11B depict further example methods for configuring resources in a communication network, in accordance with certain aspects of the present disclosure.

FIG. 11A depicts another example method 1100 for configuring resources in a communication network.

Method 1100 begins at step 1102 with establishing a data connection with a user equipment.

Method 1100 then proceeds to step 1104 with transmitting to the user equipment via the data connection an indication to update a V2X sidelink pool configuration.

In some embodiments of method 1100, the indication to update the V2X sidelink pool configuration comprises a logical channel ID, and the logical channel ID comprises a bit string in a header of a MAC control element.

In some embodiments of method 1100, the indication to update the V2X sidelink pool configuration is configured to cause the user equipment to change a number of physical resource blocks allocated to a sidelink pool.

In some embodiments of method 1100, the indication to update the V2X sidelink pool configuration is further configured to cause the user equipment to change a location of the number of physical resource blocks allocated to the sidelink pool.

In some embodiments of method 1100, the data connection comprises an access link of a Uu air interface.

In some embodiments of method 1100, the data connection comprises a sidelink of a PC5 air interface.

In some embodiments, method 1100 is performed by a network element, such as a base station (e.g., BS 110*a* of FIG. 1) or RSU (e.g., 410 of FIG. 4A).

Figure 11B:
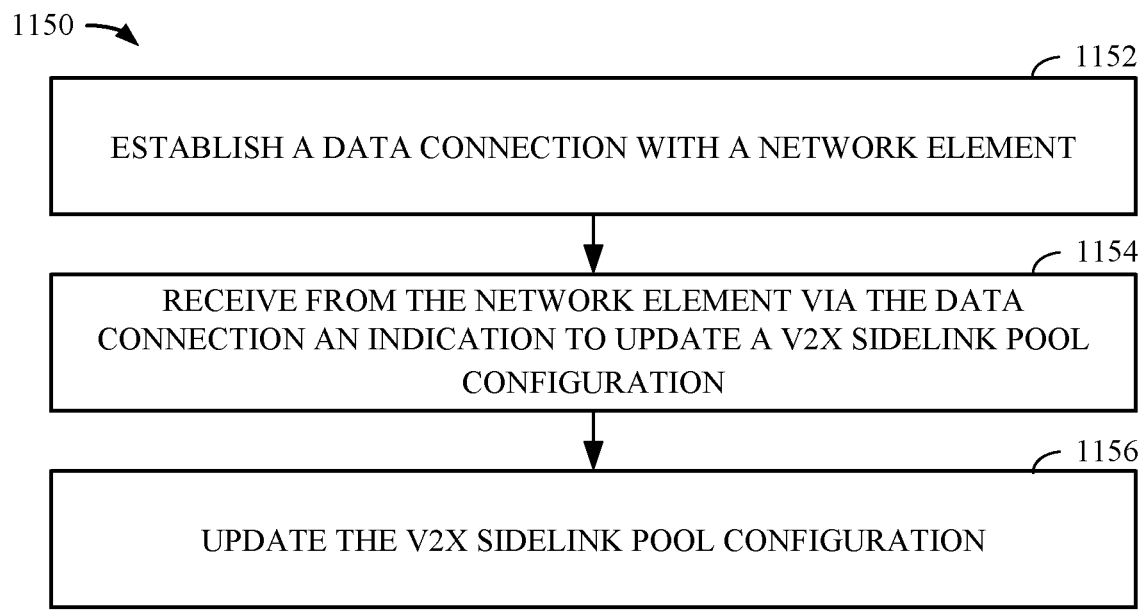

FIG. 11B depicts another example method 1150 for configuring resources in a communication network.

Method 1150 begins at step 1152 with establishing a data connection with a network element.

Method 1150 then proceeds to step 1154 with receiving from the network element via the data connection an indication to update a V2X sidelink pool configuration.

In some embodiments of method 1150, the indication to update the V2X sidelink pool configuration comprises a logical channel ID, and the logical channel ID comprises a bit string in a header of a MAC control element.

Method 1150 then proceeds to step 1156 with updating the V2X sidelink pool configuration.

In some embodiments of method 1150, updating the V2X sidelink pool configuration comprises changing a number of physical resource blocks allocated to a V2X sidelink pool.

In some embodiments of method 1150, updating the V2X sidelink pool configuration further comprises changing a location of the number of physical resource blocks allocated to the V2X sidelink pool.

In some embodiments, method 1150 further includes transmitting a sidelink message to a vehicle user equipment according to the updated V2X sidelink pool configuration.

In some embodiments, method 1150 further includes waiting a preconfigured number of time slots after receiving the indication to update the V2X sidelink pool configuration before updating the V2X sidelink pool configuration.

In some embodiments, method 1150 further includes receiving from the network element via an RRC message, the preconfigured number of time slots.

In some embodiments of method 1150, the network element comprises a base station, and the data connection comprises an access link of a Uu air interface.

In some embodiments of method 1150, the network element comprises a roadside unit, and the data connection comprises a sidelink of a PC5 air interface.

In some embodiments, method 1150 is performed by and a UE (e.g., the UE 120*a* in the wireless communication network 100 of FIG. 1 or PUE 414 in FIG. 4A) and/or VUE (e.g., 402 in FIG. 4A).

Figure 12A:
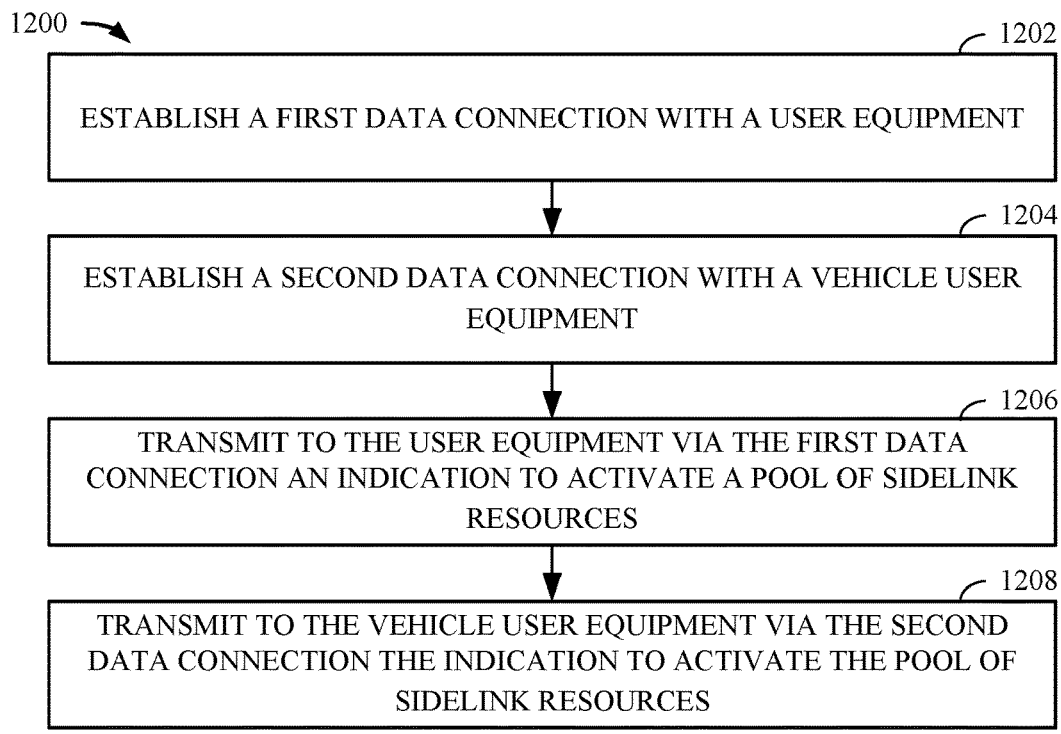
FIGS. 12A-12B depict further example methods for configuring resources in a communication network, in accordance with certain aspects of the present disclosure.

FIG. 12A depicts another example method 1200 for configuring resources in a communication network.

Method 1200 begins at step 1202 with establishing a first data connection with a user equipment.

Method 1200 then proceeds to step 1204 with establishing a second data connection with a vehicle user equipment.

Method 1200 then proceeds to step 1206 with transmitting to the user equipment via the first data connection an indication to activate a pool of sidelink resources.

Method 1200 then proceeds to step 1208 with transmitting to the vehicle user equipment via the second data connection the indication to activate the pool of sidelink resources.

In some embodiments of method 1200, the indication to activate the pool of sidelink resources comprises a first logical channel ID, and the first logical channel ID comprises a bit string in a header of a MAC control element.

In some embodiments, method 1200 further includes transmitting to the user equipment via the first data connection an indication to configure the pool of sidelink resources; and transmitting to the vehicle user equipment via the second data connection the indication to configure the pool of sidelink resources.

In some embodiments of method 1200, the indication to configure the pool of sidelink resources comprises a second logical channel ID, and the second logical channel ID comprises a bit string in a header of a MAC control element.

In some embodiments of method 1200, the indication to configure the pool of sidelink resources is configured to cause activation of a pool of V2X sidelink resources, and the pool of V2X sidelink resources is a subset of the pool of sidelink resources.

In some embodiments of method 1200, the indication to configure the pool of sidelink resources is configured to cause a change in a DRX cycle time for a pool of V2X sidelink resources, and the pool of V2X sidelink resources is a subset of the pool of sidelink resources.

In some embodiments of method 1200, the indication to configure the pool of sidelink resources is configured to cause a change at least one of a number of physical resource blocks or a time-frequency allocation of a pool of V2X sidelink resources, and the pool of V2X sidelink resources is a subset of the pool of sidelink resources.

In some embodiments, method 1200 further includes transmitting to the user equipment via the first data connection an indication to deactivate the pool of sidelink resources; and transmitting to the vehicle user equipment via the second data connection the indication to deactivate the pool of sidelink resources.

In some embodiments of method 1200, the indication to deactivate the pool of sidelink resources comprises a third logical channel ID, and the third logical channel ID comprises a bit string in a header of a MAC control element.

In some embodiments of method 1200, the first data connection with the user equipment comprises a first access link, and the second data connection with the vehicle user equipment comprises a second access link. In some embodiments of method 1200, transmitting to the user equipment via the first data connection the indication to activate the pool of sidelink resources comprises transmitting the indication to activate the pool of sidelink resources via a downlink shared channel of the first access link, and transmitting to the vehicle user equipment via the second data connection the indication to activate the pool of sidelink resources comprises transmitting the indication to activate the pool of sidelink resources via a downlink shared channel of the second access link.

In some embodiments of method 1200, the first access link and the second access link comprise Uu air interfaces.

In some embodiments of method 1200, the first data connection with the user equipment comprises a first sidelink, and the second data connection with the vehicle user equipment comprises a second sidelink.

In some embodiments of method 1200, the first sidelink and the second sidelink comprise PC5 air interfaces.

In some embodiments, method 1200 is performed by a network element, such as a base station (e.g., BS 110*a* of FIG. 1) or RSU (e.g., 410 of FIG. 4A).

Figure 12B:
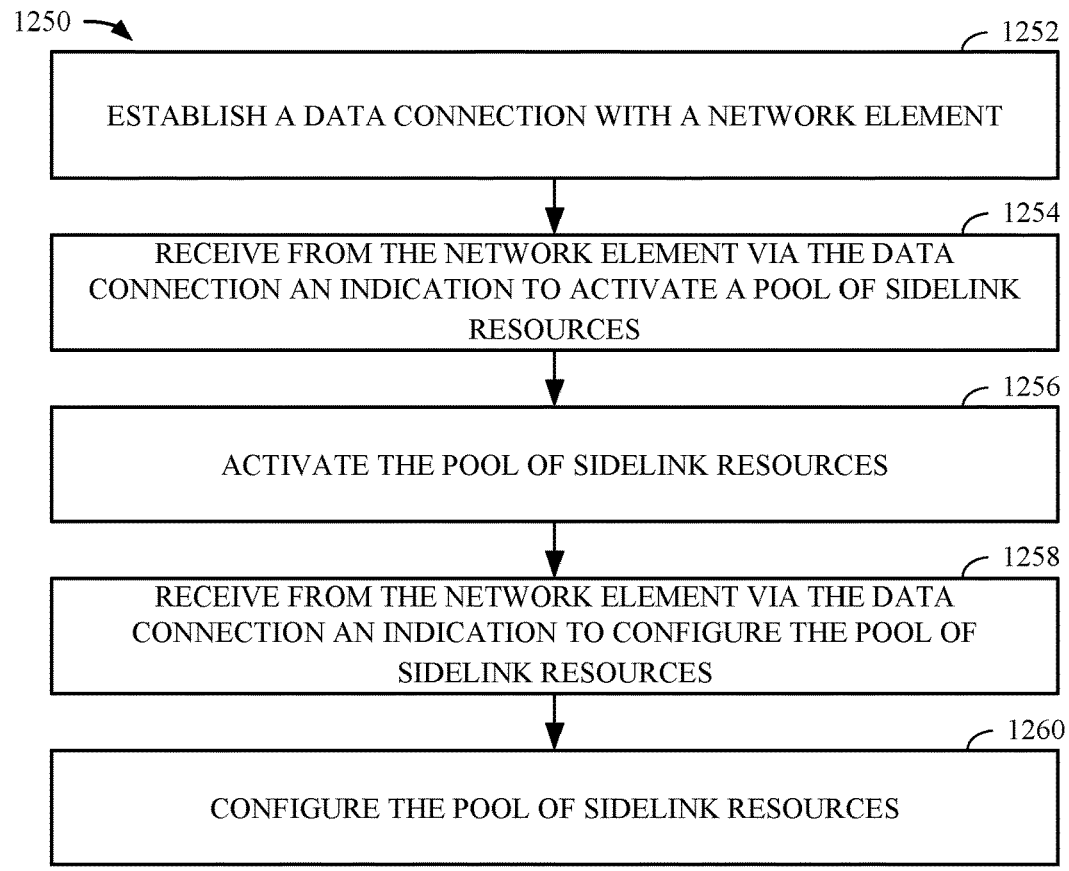

FIG. 12B depicts another example method 1250 for configuring resources in a communication network.

Method 1250 begins at step 1252 with establishing a data connection with a network element.

Method 1250 then proceeds to step 1254 with receiving from the network element via the data connection an indication to activate a pool of sidelink resources.

Method 1250 then proceeds to step 1256 with activating the pool of sidelink resources.

Method 1250 then proceeds to step 1258 with receiving from the network element via the data connection an indication to configure the pool of sidelink resources.

Method 1250 then proceeds to step 1254 with configuring the pool of sidelink resources.

In some embodiments of method 1250, the indication to activate the pool of sidelink resources comprises a first logical channel ID and the first logical channel ID comprises a bit string in a header of a MAC control element, and the indication to configure the pool of sidelink resources comprises a second logical channel ID and the second logical channel ID comprises a bit string in a header of a MAC control element.

In some embodiments, method 1250 further includes activating a pool of V2X sidelink resources based on the indication to configure the pool of sidelink resources, wherein the pool of V2X sidelink resources is a subset of the pool of sidelink resources.

In some embodiments, method 1250 further includes changing a DRX cycle time for a pool of V2X sidelink resources based on the indication to configure the pool of sidelink resources, wherein the pool of V2X sidelink resources is a subset of the pool of sidelink resources.

In some embodiments, method 1250 further includes changing at least one of a number of physical resource blocks or a time-frequency allocation of a pool of V2X sidelink resources based on the indication to configure the pool of sidelink, wherein the pool of V2X sidelink resources is a subset of the pool of sidelink resources.

In some embodiments, method 1250 further includes receiving from the network element via the data connection an indication to deactivate the pool of sidelink resources; and deactivating the pool of sidelink resources.

In some embodiments of method 1250, the indication to deactivate the pool of sidelink resources comprises a third logical channel ID, and the third logical channel ID comprises a bit string in a header of a MAC control element.

In some embodiments of method 1250, the network element comprises a base station, the data connection comprises an access link, and receiving via the data connection the indication to activate the pool of sidelink resources comprises receiving the indication to activate the pool of sidelink resources via a downlink shared channel of the access link.

In some embodiments of method 1250, the access link comprises a Uu air interface.

In some embodiments of method 1250, the network element comprises a roadside unit, and the data connection with comprises a sidelink.

In some embodiments of method 1250, the sidelink comprises a PC5 air interface.

In some embodiments, method 1250 is performed by and a UE (e.g., the UE 120*a* in the wireless communication network 100 of FIG. 1 or PUE 414 in FIG. 4A) and/or VUE (e.g., 402 in FIG. 4A).

Example Communication Devices

Figure 13:
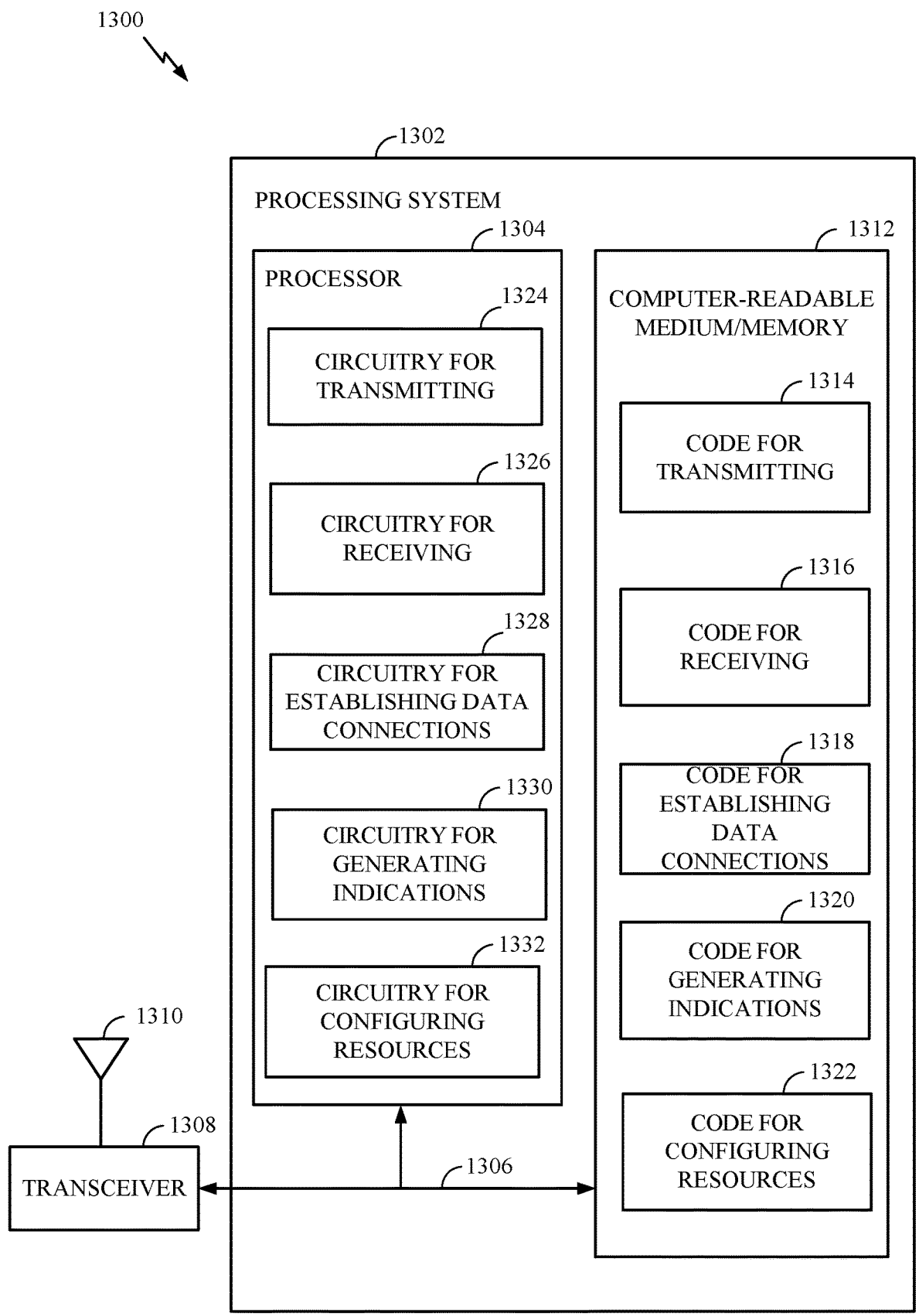
FIG. 13 depicts an example communications device that may include various components configured to perform operations for the techniques disclosed herein, in accordance with aspects of the present disclosure.

FIG. 13 depicts an example communications device 1300 that includes various components (e.g., corresponding to means-plus-function components) configured to perform operations for the techniques disclosed herein, such as the operations illustrated in FIGS. 5A-12B. The communications device 1300 includes a processing system 1302 coupled to a transceiver 1308 (e.g., a transmitter and/or a receiver). The transceiver xx08 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIGS. 5A-12B, or other operations for performing the various techniques discussed herein for dynamically controlling sidelink resources in a communication network. In certain aspects, computer-readable medium/memory 1312 stores code 1314 for transmitting; code 1316 for receiving, code 1318 for establishing data connections, code 1320 for generating indications, and code 1322 for configuring network resources, such as sidelink resources. In certain aspects, the processor 1304 has circuitry configured to implement the code stored in the computer-readable medium/memory 1312. In this embodiment, 1304 includes circuitry 1324 for transmitting; circuitry 1326 for receiving, circuitry 1328 for establishing data connections, circuitry 1330 for generating indications, and circuitry 1332 for configuring network resources, such as sidelink resources.

Notably, FIG. 13 is just one example, and other embodiments of a communication device may include additional or fewer features. For example, all or a subset of the aspects of communication device 1300 may be found in a UE (e.g., the UE 120*a* in the wireless communication network 100 of FIG. 1 or PUE 414 in FIG. 4A) and/or VUE (e.g., 402 in FIG. 4A). In other examples, all or a subset of the aspects of communication device 1300 may be found in a network element, such as a base station (e.g., BS 110*a* of FIG. 1) or RSU (e.g., 410 of FIG. 4A).

Example Clauses

Implementation examples are described in the following numbered clauses:

Clause 1: A method for configuring resources in a communication network, comprising: establishing a first data connection with a user equipment; establishing a second data connection with a vehicle user equipment; transmitting to the user equipment via the first data connection an indication to activate a pool of V2X sidelink resources; and transmitting to the vehicle user equipment via the second data connection the indication to activate the pool of V2X sidelink resources.

Clause 2: The method of Clause 1, wherein: the indication to activate the pool of V2X sidelink resources comprises a first logical channel ID, and the first logical channel ID comprises a bit string in a header of a MAC control element.

Clause 3: The method of any one of Clauses 1-2 1, further comprising: transmitting to the user equipment via the first data connection an indication to deactivate the pool of V2X sidelink resources; and transmitting to the vehicle user equipment via the second data connection the indication to deactivate the pool of V2X sidelink resources.

Clause 4: The method of Clause 3, wherein: the indication to deactivate the pool of V2X sidelink resources comprises a second logical channel ID, and the second logical channel ID comprises a bit string in a header of a MAC control element.

Clause 5: The method of any one of Clauses 1-4, wherein: the first data connection with the user equipment comprises a first access link, the second data connection with the vehicle user equipment comprises a second access link, transmitting to the user equipment via the first data connection the indication to activate the pool of V2X sidelink resources comprises transmitting the indication to activate the pool of V2X sidelink resources via a downlink shared channel of the first access link, and transmitting to the vehicle user equipment via the second data connection the indication to activate the pool of V2X sidelink resources comprises transmitting the indication to activate the pool of V2X sidelink resources via a downlink shared channel of the second access link.

Clause 6: The method of Clause 5, wherein the first access link and the second access link comprise Uu air interfaces.

Clause 7: The method of any one of Clauses 1-6, wherein: the first data connection with the user equipment comprises a first sidelink, and the second data connection with the vehicle user equipment comprises a second sidelink.

Clause 8: The method of Clause 7, wherein the first sidelink and the second sidelink comprise PC5 air interfaces.

Clause 9: A method for configuring resources in a communication network, comprising: establishing a data connection with a network element; receiving via the data connection an indication to activate a pool of V2X sidelink resources; activating the pool of V2X sidelink resources; and transmitting a message to a vehicle user equipment via a second data connection using the pool of V2X sidelink resources.

Clause 10: The method of Clause 9, wherein: the indication to activate the pool of V2X sidelink resources comprises a first logical channel ID, and the first logical channel ID comprises a bit string in a header of a MAC control element.

Clause 11: The method of any one of Clauses 9-10, further comprising: receiving from the network element via the data connection an indication to deactivate the pool of V2X sidelink resources; and deactivating the pool of V2X sidelink resources.

Clause 12: The method of any one of Clauses 9-11, wherein: the indication to deactivate the pool of V2X sidelink resources comprises a second logical channel ID, and the second logical channel ID comprises a bit string in a header of a MAC control element.

Clause 13: The method of any one of Clauses 9-12, wherein: the data connection with the network element comprises an access link, and receiving via the data connection the indication to activate the pool of V2X sidelink resources comprises receiving the indication to activate the pool of V2X sidelink resources via a downlink shared channel of the access link.

Clause 14: The method of Clause 13, wherein: the network element comprises a base station, and the access link comprises a Uu air interface.

Clause 15: The method of Clause 13, wherein: the network element comprises a roadside unit, and the data connection with the network element comprises a sidelink.

Clause 16: The method of Clause 15, wherein the sidelink comprises a PC5 air interface.

Clause 17: A method for configuring resources in a communication network, comprising: establishing a data connection with a user equipment; transmitting to the user equipment via the data connection an indication to update a DRX interval, wherein: the indication to update a DRX interval comprises a logical channel ID, and the logical channel ID comprises a bit string in a header of a MAC control element.

Clause 18: The method of Clause 17, wherein the data connection comprises an access link of a Uu air interface.

Clause 19: The method of Clause 17, wherein the data connection comprises a sidelink of a PC5 air interface.

Clause 20: A method for configuring resources in a communication network, comprising: establishing a data connection with a network element; receiving from the network element via the data connection an indication to update a DRX cycle time, wherein: the indication to update the DRX cycle time comprises a logical channel ID, and the logical channel ID comprises a bit string in a header of a MAC control element; and updating the DRX cycle time.

Clause 21: The method of Clause 20, further comprising: entering a DRX period according to the updated DRX cycle time.

Clause 22: The method of Clause 21, further comprising: waiting a preconfigured number of time slots after receiving the indication to update the DRX cycle time before entering the DRX period.

Clause 23: The method of Clause 22, further comprising: receiving from the network element via an RRC message, the preconfigured number of time slots.

Clause 24: The method of any one of Clauses 20-23, wherein: the network element comprises a base station, and the data connection comprises an access link of a Uu air interface.

Clause 25: The method of any one of Clauses 20-23, wherein: the network element comprises a roadside unit, and the data connection comprises a sidelink of a PC5 air interface.

Clause 26: A method for configuring resources in a communication network, comprising: establishing a data connection with a user equipment; transmitting to the user equipment via the data connection an indication to update a V2X sidelink pool configuration, wherein: the indication to update the V2X sidelink pool configuration comprises a logical channel ID, and the logical channel ID comprises a bit string in a header of a MAC control element.

Clause 27: The method of Clause 26, wherein the indication to update the V2X sidelink pool configuration is configured to cause the user equipment to change a number of physical resource blocks allocated to a sidelink pool.

Clause 28: The method of Clause 27, wherein the indication to update the V2X sidelink pool configuration is further configured to cause the user equipment to change a location of the number of physical resource blocks allocated to the sidelink pool.

Clause 29: The method of any one of Clauses 26-28, wherein the data connection comprises an access link of a Uu air interface.

Clause 30: The method of any one of Clauses 26-28, wherein the data connection comprises a sidelink of a PC5 air interface.

Clause 31: A method for configuring resources in a communication network, comprising: establishing a data connection with a network element; receiving from the network element via the data connection an indication to update a V2X sidelink pool configuration, wherein: the indication to update the V2X sidelink pool configuration comprises a logical channel ID, and the logical channel ID comprises a bit string in a header of a MAC control element; and updating the V2X sidelink pool configuration.

Clause 32: The method of Clause 31, wherein updating the V2X sidelink pool configuration comprises changing a number of physical resource blocks allocated to a V2X sidelink pool.

Clause 33: The method of Clause 32, wherein updating the V2X sidelink pool configuration further comprises changing a location of the number of physical resource blocks allocated to the V2X sidelink pool.

Clause 34: The method of any one of Clauses 31-33, further comprising: transmitting a sidelink message to a vehicle user equipment according to the updated V2X sidelink pool configuration.

Clause 35: The method of any one of Clauses 31-34, further comprising: waiting a preconfigured number of time slots after receiving the indication to update the V2X sidelink pool configuration before updating the V2X sidelink pool configuration.

Clause 36: The method of Clause 35, further comprising: receiving from the network element via an RRC message, the preconfigured number of time slots.

Clause 37: The method of any one of Clauses 31-36, wherein: the network element comprises a base station, and the data connection comprises an access link of a Uu air interface.

Clause 38: The method of any one of Clauses 31-36, wherein: the network element comprises a roadside unit, and the data connection comprises a sidelink of a PC5 air interface.

Clause 39: A method for configuring resources in a communication network, comprising: establishing a first data connection with a user equipment; establishing a second data connection with a vehicle user equipment; transmitting to the user equipment via the first data connection an indication to activate a pool of sidelink resources; and transmitting to the vehicle user equipment via the second data connection the indication to activate the pool of sidelink resources.

Clause 40: The method of Clause 39, wherein: the indication to activate the pool of sidelink resources comprises a first logical channel ID, and the first logical channel ID comprises a bit string in a header of a MAC control element.

Clause 41: The method of Clause 40, further comprising: transmitting to the user equipment via the first data connection an indication to configure the pool of sidelink resources; and transmitting to the vehicle user equipment via the second data connection the indication to configure the pool of sidelink resources.

Clause 42: The method of Clause 41, wherein: the indication to configure the pool of sidelink resources comprises a second logical channel ID, and the second logical channel ID comprises a bit string in a header of a MAC control element.

Clause 43: The method of Clause 42, wherein: the indication to configure the pool of sidelink resources is configured to cause activation of a pool of V2X sidelink resources, and the pool of V2X sidelink resources is a subset of the pool of sidelink resources.

Clause 44: The method of Clause 43, wherein: the indication to configure the pool of sidelink resources is configured to cause a change in a DRX cycle time for a pool of V2X sidelink resources, and the pool of V2X sidelink resources is a subset of the pool of sidelink resources.

Clause 45: The method of Clause 43, wherein: the indication to configure the pool of sidelink resources is configured to cause a change at least one of a number of physical resource blocks or a time-frequency allocation of a pool of V2X sidelink resources, and the pool of V2X sidelink resources is a subset of the pool of sidelink resources.

Clause 46: The method of any one of Clauses 42-45, further comprising: transmitting to the user equipment via the first data connection an indication to deactivate the pool of sidelink resources; and transmitting to the vehicle user equipment via the second data connection the indication to deactivate the pool of sidelink resources.

Clause 47: The method of Clause 46, wherein: the indication to deactivate the pool of sidelink resources comprises a third logical channel ID, and the third logical channel ID comprises a bit string in a header of a MAC control element.

Clause 48: The method of any one of Clauses 39-47, wherein: the first data connection with the user equipment comprises a first access link, the second data connection with the vehicle user equipment comprises a second access link, transmitting to the user equipment via the first data connection the indication to activate the pool of sidelink resources comprises transmitting the indication to activate the pool of sidelink resources via a downlink shared channel of the first access link, and transmitting to the vehicle user equipment via the second data connection the indication to activate the pool of sidelink resources comprises transmitting the indication to activate the pool of sidelink resources via a downlink shared channel of the second access link.

Clause 49: The method of Clause 48, wherein the first access link and the second access link comprise Uu air interfaces.

Clause 50: The method of any one of Clauses 39-49, wherein: the first data connection with the user equipment comprises a first sidelink, and the second data connection with the vehicle user equipment comprises a second sidelink.

Clause 51: The method of Clause 50, wherein the first sidelink and the second sidelink comprise PC5 air interfaces.

Clause 52: A method for configuring resources in a communication network, comprising: establishing a data connection with a network element; receiving from the network element via the data connection an indication to activate a pool of sidelink resources; activating the pool of sidelink resources; receiving from the network element via the data connection an indication to configure the pool of sidelink resources; and configuring the pool of sidelink resources.

Clause 53: The method of Clause 52, wherein: the indication to activate the pool of sidelink resources comprises a first logical channel ID and the first logical channel ID comprises a bit string in a header of a MAC control element, and the indication to configure the pool of sidelink resources comprises a second logical channel ID and the second logical channel ID comprises a bit string in a header of a MAC control element.

Clause 54: The method of Clause 53, further comprising: activating a pool of V2X sidelink resources based on the indication to configure the pool of sidelink resources, wherein the pool of V2X sidelink resources is a subset of the pool of sidelink resources.

Clause 55: The method of Clause 53, further comprising: changing a DRX cycle time for a pool of V2X sidelink resources based on the indication to configure the pool of sidelink resources, wherein the pool of V2X sidelink resources is a subset of the pool of sidelink resources.

Clause 56: The method of Clause 53, further comprising: changing at least one of a number of physical resource blocks or a time-frequency allocation of a pool of V2X sidelink resources based on the indication to configure the pool of sidelink resources, wherein the pool of V2X sidelink resources is a subset of the pool of sidelink resources.

Clause 57: The method of any one of Clauses 52-56, further comprising: receiving from the network element via the data connection an indication to deactivate the pool of sidelink resources; and deactivating the pool of sidelink resources.

Clause 58: The method of Clause 57, wherein: the indication to deactivate the pool of sidelink resources comprises a third logical channel ID, and the third logical channel ID comprises a bit string in a header of a MAC control element.

Clause 59: The method of any one of Clauses 52-58, wherein: the network element comprises a base station, the data connection comprises an access link, and receiving via the data connection the indication to activate the pool of sidelink resources comprises receiving the indication to activate the pool of sidelink resources via a downlink shared channel of the access link.

Clause 60: The method of Clause 59, wherein the access link comprises a Uu air interface.

Clause 61: The method of any one of Clauses 52-60, wherein: the network element comprises a roadside unit, and the data connection with comprises a sidelink.

Clause 62: The method of Clause 61, wherein the sidelink comprises a PC5 air interface.

Clause 63: A method for configuring resources at a user equipment, comprising: establishing a first data connection with a network element; receiving from the network element, via the first data connection, a first indication to activate a pool of sidelink resources; activating the pool of sidelink resources according to the first indication; receiving from the network element via the first data connection a second indication to configure the pool of sidelink resources; and configuring the pool of sidelink resources according to the second indication.

Clause 64: The method of Clause 63, wherein: the first indication to activate the pool of sidelink resources comprises a first logical channel ID and the first logical channel ID comprises a bit string in a header of a MAC control element, and the second indication to configure the pool of sidelink resources comprises a second logical channel ID and the second logical channel ID comprises a bit string in a header of a MAC control element.

Clause 65: The method of Clause 64, further comprising: activating a pool of V2X sidelink resources based on the second indication to configure the pool of sidelink resources, wherein the pool of V2X sidelink resources is a subset of the pool of sidelink resources.

Clause 66: The method of Claim 64, further comprising: changing a DRX cycle time for a pool of V2X sidelink resources based on the second indication to configure the pool of sidelink resources, wherein the pool of V2X sidelink resources is a subset of the pool of sidelink resources.

Clause 67: The method of Clause 64, further comprising: changing at least one of a number of physical resource blocks or a time-frequency allocation of a pool of V2X sidelink resources based on the second indication to configure the pool of sidelink resources, wherein the pool of V2X sidelink resources is a subset of the pool of sidelink resources.

Clause 68: The method of Clause 65, further comprising: receiving from the network element, via the first data connection, a third indication to deactivate the pool of V2X sidelink resources; and deactivating the pool of V2X sidelink resources according to the third indication.

Clause 69: The method of Clause 63, further comprising: receiving from the network element, via the first data connection, a third indication to deactivate the pool of sidelink resources; and deactivating the pool of sidelink resources according to the third indication.

Clause 70: The method of Clause 69, wherein: the third indication to deactivate the pool of sidelink resources comprises a third logical channel ID, and the third logical channel ID comprises a bit string in a header of a MAC control element.

Clause 71: The method of any one of Clauses 63-70, wherein: the network element comprises a base station, the first data connection comprises an access link, and the method further comprises receiving the first indication to activate the pool of sidelink resources via a downlink shared channel of the access link.

Clause 72: The method of Clause 71, wherein the access link comprises a Uu air interface.

Clause 73: The method of any one of Clauses 63-70, wherein: the network element comprises a roadside unit, and the first data connection comprises a sidelink.

Clause 74: The method of Clause 73, wherein the sidelink comprises a PC5 air interface.

Clause 75: The method of Clause 65, further comprising transmitting a message to a vehicle user equipment via a second data connection using the pool of V2X sidelink resources.

Clause 76: The method of Clause 65, further comprising receiving a message from a vehicle user equipment via a second data connection using the pool of V2X sidelink resources.

Clause 77: A processing system, comprising: a memory comprising computer-executable instructions; one or more processors configured to execute the computer-executable instructions and cause the processing system to perform a method in accordance with any one of Clauses 1-76.

Clause 78: A processing system, comprising means for performing a method in accordance with any one of Clauses 1-76.

Clause 79: A non-transitory computer-readable medium comprising computer-executable instructions that, when executed by one or more processors of a processing system, cause the processing system to perform a method in accordance with any one of Clauses 1-76.

Clause 80: A computer program product embodied on a computer-readable storage medium comprising code for performing a method in accordance with any one of Clauses 1-76.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein, for example, instructions for performing the operations described herein and illustrated in FIGS. 5A-12B.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A user equipment, comprising:
a memory comprising computer-executable instructions; and
one or more processors, individually or collectively, configured to execute the computer-executable instructions and cause the user equipment to:
establish a first data connection with a network element;
receive from the network element, via the first data connection, a first logical channel ID (LCID) in a header of a first Medium-Access Control (MAC) control element configured to cause the user equipment to activate a pool of sidelink resources, wherein a value of the first LCID is mapped to enabling the pool of sidelink resources and another value of the first LCID is mapped to disabling the pool of sidelink resources;
activate the pool of sidelink resources according to the first LCID;
receive from the network element via the first data connection a second LCID in a header of a second MAC control element configured to cause the user equipment to configure the pool of sidelink resources for sidelink communication, wherein, to cause the user equipment to configure the pool of sidelink resources, the second LCID is configured to cause the user equipment to configure one or more operating parameters for the sidelink communication using the pool of sidelink resources, wherein a value of the second LCID is mapped to the one or more operating parameters to cause the user equipment to configure the one or more operating parameters and another value of the second LCID is mapped to changing at least one of a number of physical resource blocks or a time-frequency allocation of the pool of sidelink resources; and
configure the pool of sidelink resources according to the second LCID.

2. The user equipment of claim 1, wherein the one or more processors are further configured to cause the user equipment to:
activate a pool of vehicle-to-everything (V2X) sidelink resources based on the second LCID,
wherein the pool of V2X sidelink resources is a subset of the pool of sidelink resources.

3. The user equipment of claim 2, wherein the one or more processors are further configured to cause the user equipment to:
receive from the network element, via the first data connection, a third LCID in a header of a third MAC control element configured to cause the user equipment to deactivate the pool of V2X sidelink resources; and
deactivate the pool of V2X sidelink resources according to the third LCID.

4. The user equipment of claim 2, wherein the one or more processors are further configured to cause the user equipment to transmit a message to a vehicle user equipment via a second data connection using the pool of V2X sidelink resources.

5. The user equipment of claim 2, wherein the one or more processors are further configured to cause the user equipment to receive a message from a vehicle user equipment via a second data connection using the pool of V2X sidelink resources.

6. The user equipment of claim 1, wherein the one or more processors are further configured to cause the user equipment to:
change a Discontinuous Reception (DRX) cycle time for a pool of vehicle-to-everything (V2X) sidelink resources based on the second LCID,
wherein the pool of V2X sidelink resources is a subset of the pool of sidelink resources.

7. The user equipment of claim 1, wherein the one or more processors are further configured to cause the user equipment to:
change at least one of the number of physical resource blocks or the time-frequency allocation of the pool of sidelink resources based on the other value of the second LCID.

8. The user equipment of claim 1, wherein the one or more processors are further configured to cause the user equipment to:
receive from the network element, via the first data connection, a third LCID in a header of a third MAC control element configured to cause the user equipment to deactivate the pool of sidelink resources; and
deactivate the pool of sidelink resources according to the third LCID.

9. The user equipment of claim 1, wherein:
the network element comprises a base station,
the first data connection comprises an access link, and
the one or more processors are further configured to cause the user equipment to receive the first LCID via a downlink shared channel of the access link.

10. The user equipment of claim 9, wherein the access link comprises a Uu air interface.

11. The user equipment of claim 1, wherein:
the network element comprises a roadside unit, and
the first data connection comprises a sidelink.

12. The user equipment of claim 11, wherein the sidelink comprises a PC5 air interface.

13. A method for configuring resources at a user equipment, comprising:
establishing a first data connection with a network element;

receiving from the network element, via the first data connection, a first logical channel ID (LCID) in a header of a first Medium-Access Control (MAC) control element configured to cause the user equipment to activate a pool of sidelink resources, wherein a value of the first LCID is mapped to enabling the pool of sidelink resources and another value of the first LCID is mapped to disabling the pool of sidelink resources;

activating the pool of sidelink resources according to the first LCID;

receiving from the network element via the first data connection a second LCID in a header of a second MAC control element configured to cause the user equipment to configure the pool of sidelink resources for sidelink communication, wherein, to cause the user equipment to configure the pool of sidelink resources, the second LCID is configured to cause the user equipment to configure one or more operating parameters for the sidelink communication using the pool of sidelink resources, wherein a value of the second LCID is mapped to the one or more operating parameters to cause the user equipment to configure the one or more operating parameters and another value of the second LCID is mapped to changing at least one of a number of physical resource blocks or a time-frequency allocation of the pool of sidelink resources; and configuring the pool of sidelink resources according to the second LCID.

14. The method of claim 13, further comprising:
activating a pool of vehicle-to-everything (V2X) sidelink resources based on the second LCID,
wherein the pool of V2X sidelink resources is a subset of the pool of sidelink resources.

15. The method of claim 14, further comprising:
receiving from the network element, via the first data connection, a third LCID in a header of a third MAC control element configured to cause the user equipment to deactivate the pool of V2X sidelink resources; and
deactivating the pool of V2X sidelink resources according to the third LCID.

16. The method of claim 14, further comprising transmitting a message to a vehicle user equipment via a second data connection using the pool of V2X sidelink resources.

17. The method of claim 14, further comprising receiving a message from a vehicle user equipment via a second data connection using the pool of V2X sidelink resources.

18. The method of claim 13, further comprising:
changing a Discontinuous Reception (DRX) cycle time for a pool of vehicle-to-everything (V2X) sidelink resources based on the second LCID,
wherein the pool of V2X sidelink resources is a subset of the pool of sidelink resources.

19. The method of claim 13, further comprising:
changing at least one of the number of physical resource blocks or the time-frequency allocation of the pool of sidelink resources based on the other value of the second LCID.

20. The method of claim 13, further comprising:
receiving from the network element, via the first data connection, a third LCID in a header of a third MAC control element configured to cause the user equipment to deactivate the pool of sidelink resources; and
deactivating the pool of sidelink resources according to the third LCID.

21. The method of claim 13, wherein:
the network element comprises a base station,
the first data connection comprises an access link, and
the method further comprises receiving the first LCID via a downlink shared channel of the access link.

22. The method of claim 21, wherein the access link comprises a Uu air interface.

23. The method of claim 13, wherein:
the network element comprises a roadside unit, and
the first data connection comprises a sidelink.

24. The method of claim 23, wherein the sidelink comprises a PC5 air interface.

25. A user equipment, comprising:
means for establishing a first data connection with a network element;
means for receiving from the network element, via the first data connection, a first logical channel ID (LCID) in a header of a first Medium-Access Control (MAC) control element configured to cause the user equipment to activate a pool of sidelink resources, wherein a value of the first LCID is mapped to enabling the pool of sidelink resources and another value of the first LCID is mapped to disabling the pool of sidelink resources;
means for activating the pool of sidelink resources according to the first LCID;
means for receiving from the network element via the first data connection a second LCID in a header of a second MAC control element configured to cause the user equipment to configure the pool of sidelink resources for sidelink communication, wherein, to cause the user equipment to configure the pool of sidelink resources, the second LCID is configured to cause the user equipment to configure one or more operating parameters for the sidelink communication using the pool of sidelink resources, wherein a value of the second LCID is mapped to the one or more operating parameters to cause the user equipment to configure the one or more operating parameters and another value of the second LCID is mapped to changing at least one of a number of physical resource blocks or a time-frequency allocation of the pool of sidelink resources; and
means for configuring the pool of sidelink resources according to the second LCID.

26. A non-transitory computer-readable medium comprising computer-executable instructions that, when executed by a processor of a user equipment, cause the user equipment to perform a method for configuring resources, the method comprising:
establishing a first data connection with a network element;
receiving from the network element, via the first data connection, a first logical channel ID (LCID) in a header of a first Medium-Access Control (MAC) control element configured to cause the user equipment to activate a pool of sidelink resources, wherein a value of the first LCID is mapped to enabling the pool of sidelink resources and another value of the first LCID is mapped to disabling the pool of sidelink resources;
activating the pool of sidelink resources according to the first LCID;
receiving from the network element via the first data connection a second LCID configured to cause the user equipment to configure the pool of sidelink resources for sidelink communication, wherein, to cause the user equipment to configure the pool of sidelink resources, the second LCID is configured to cause the user equipment to configure one or more operating parameters for the sidelink communication using the pool of sidelink resources, wherein a value of the second LCID is mapped to the one or more operating parameters to cause the user equipment to configure the one or more operating parameters and another value of the second LCID is mapped to changing at least one of a number of physical resource blocks or a time-frequency allocation of the pool of sidelink resources; and
configuring the pool of sidelink resources according to the second LCID.

* * * * *